(12) United States Patent
Usher et al.

(10) Patent No.: US 10,817,252 B2
(45) Date of Patent: Oct. 27, 2020

(54) EARPHONE SOFTWARE AND HARDWARE

(71) Applicant: Staton Techiya, LLC, Delray Beach, FL (US)

(72) Inventors: John Usher, Beer (GB); John P. Keady, Fairfax Station, VA (US)

(73) Assignee: Staton Techiya, LLC, Delray Beach, FL (US)

( * ) Notice: Subject to any disclaimer, the term of this patent is extended or adjusted under 35 U.S.C. 154(b) by 0 days.

(21) Appl. No.: 16/298,147

(22) Filed: Mar. 11, 2019

(65) Prior Publication Data

US 2019/0278556 A1 Sep. 12, 2019

Related U.S. Application Data

(60) Provisional application No. 62/641,313, filed on Mar. 10, 2018.

(51) Int. Cl.
| | |
|---|---|
| *H04R 5/04* | (2006.01) |
| *H04R 25/00* | (2006.01) |
| *H04R 3/00* | (2006.01) |
| *G06F 3/16* | (2006.01) |
| *G10L 15/08* | (2006.01) |
| *H04R 1/10* | (2006.01) |
| *G06F 3/0484* | (2013.01) |
| *A61B 5/00* | (2006.01) |
| *G10L 15/22* | (2006.01) |
| *G10L 25/51* | (2013.01) |

(52) U.S. Cl.
CPC .......... *G06F 3/165* (2013.01); *G06F 3/04842* (2013.01); *G06F 3/04847* (2013.01); *G10L 15/08* (2013.01); *G10L 15/22* (2013.01); *H04R 1/1041* (2013.01); *G10L 25/51* (2013.01); *G10L 2015/088* (2013.01); *G10L 2015/223* (2013.01); *H04R 1/1016* (2013.01)

(58) Field of Classification Search
CPC .. G06F 3/165; G06F 3/04842; G06F 3/04847; G06F 3/04817; H04R 5/033; H04R 1/1041; H04R 1/1091; H04R 5/04; H04R 1/10; H04R 25/50; H04R 25/505; H04R 25/43; H04R 25/407; H04R 25/453; H04R 3/005; H04R 1/1016; G10K 11/002; G10L 15/22; A61B 5/6817
USPC ......... 381/74, 56, 57, 58, 60, 312, 317, 328, 381/172
See application file for complete search history.

(56) References Cited

U.S. PATENT DOCUMENTS

| | | | |
|---|---|---|---|
| 9,812,149 B2* | 11/2017 | Yen | H04R 3/005 |
| 2008/0240458 A1* | 10/2008 | Goldstein | H04R 25/453 381/72 |
| 2017/0112671 A1* | 4/2017 | Goldstein | A61B 5/6817 |
| 2017/0230752 A1* | 8/2017 | Dohmen | H04R 5/04 |
| 2018/0063664 A1* | 3/2018 | Horbach | G06F 3/04817 |

\* cited by examiner

*Primary Examiner* — Paul Kim
*Assistant Examiner* — Ubachukwu A Odunukwe
(74) *Attorney, Agent, or Firm* — Akerman LLP; Peter A. Chiabotti; Mammen (Roy) P. Zachariah, Jr.

(57) ABSTRACT

At least one exemplary embodiment is directed to a method of earphone feature control by using a graphic user interface on a device wirelessly linked to the earphone.

20 Claims, 12 Drawing Sheets

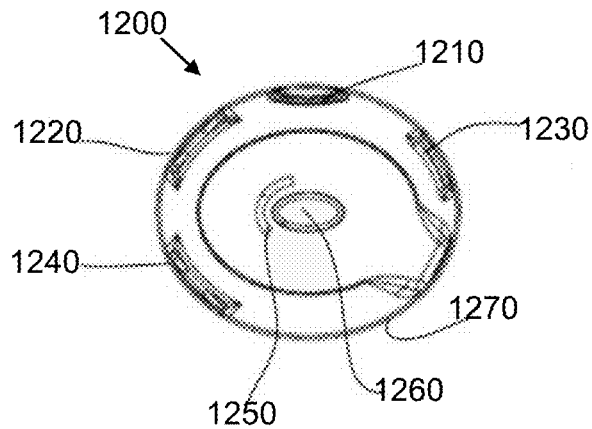
FIG. 12
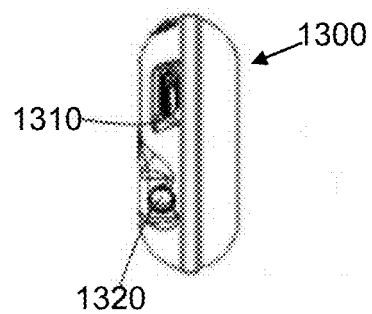
FIG. 13
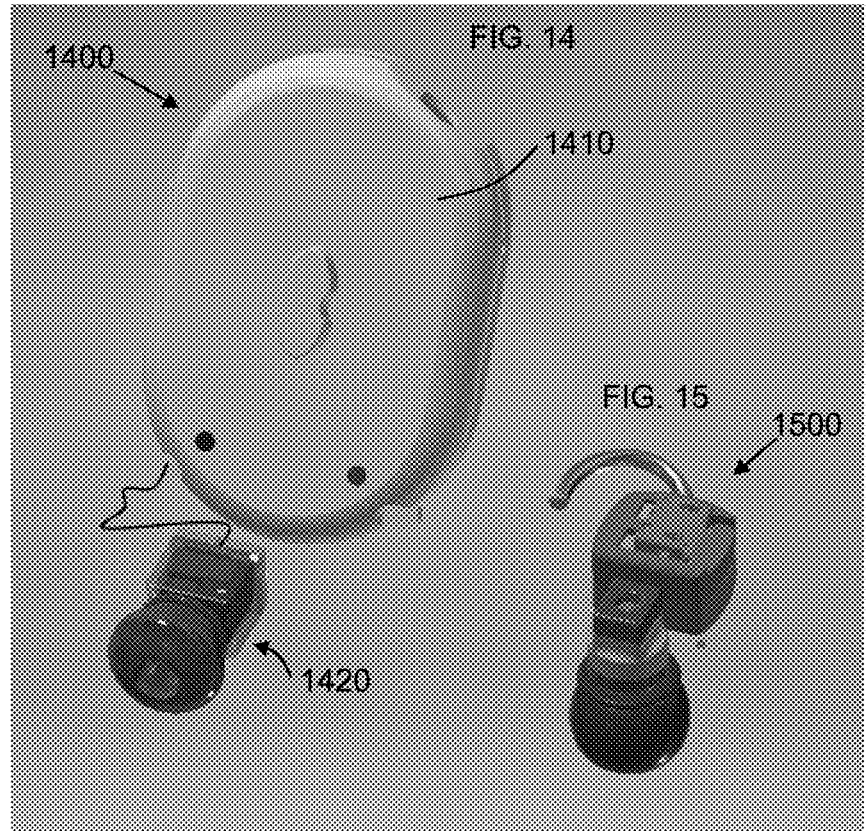
FIG. 14
FIG. 15

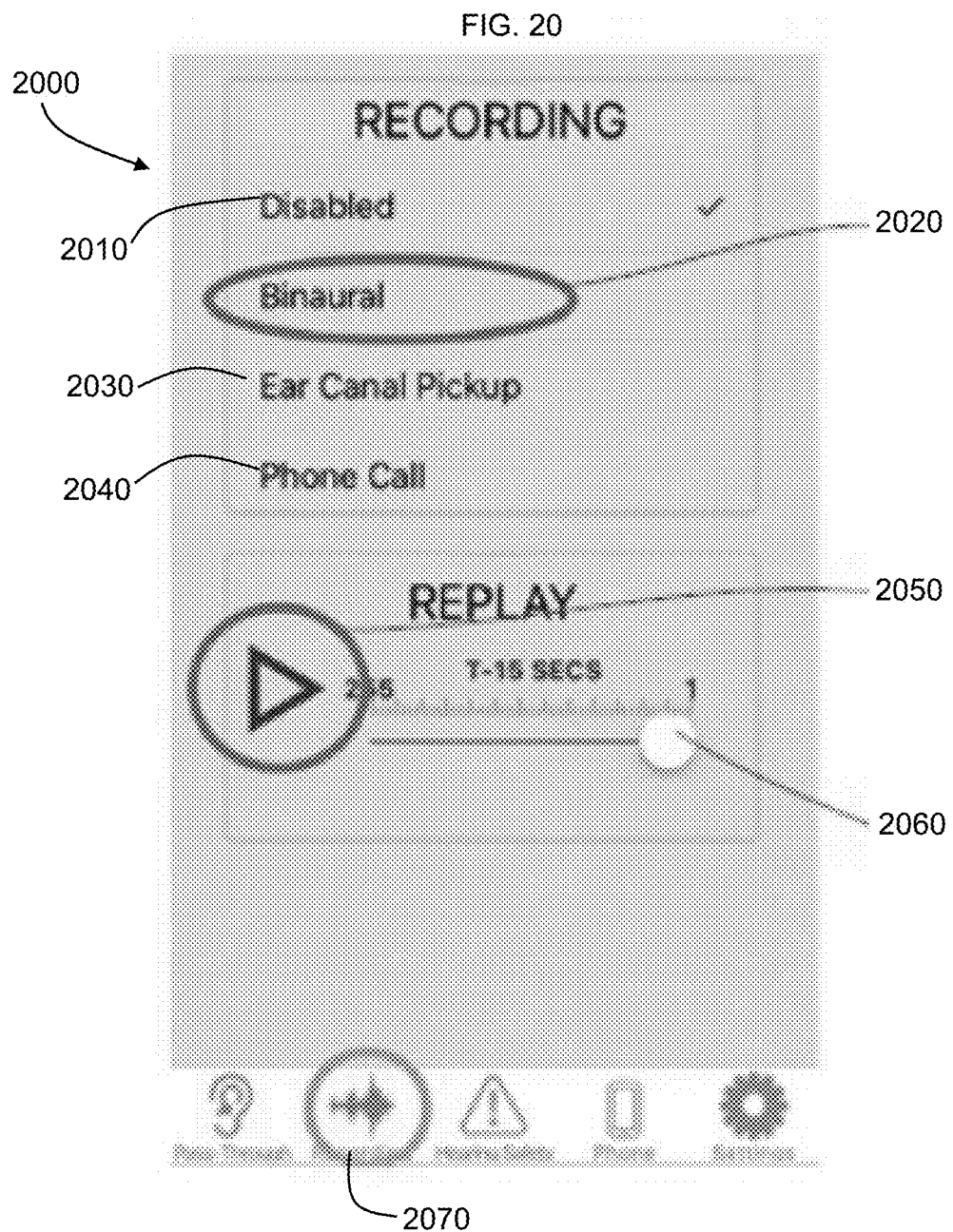

EARPHONE SOFTWARE AND HARDWARE

CROSS-REFERENCE TO RELATED APPLICATIONS

This application is a non provisional of and claims priority to U.S. Pat. App. No. 62/641,313, filed 10 Mar. 2018, the disclosure of which is incorporated herein by reference in it's entirety.

FIELD OF THE INVENTION

The present invention relates in general to methods for hardware and software components of an earphone and in particular, though not exclusively, for the hardware and software for a wireless earphone system.

BACKGROUND OF THE INVENTION

Earphones, earbuds, hearing aids all have been around for many years and each has particular components related to it's particular function, for example microphones for vocal and environmental pickup and speakers for music playback and communication. Several hardware configurations enable the environment for hardware unique software.

BRIEF DESCRIPTION OF THE DRAWINGS

Exemplary embodiments of present invention will become more fully understood from the detailed description and the accompanying drawings, wherein:

FIG. 12 illustrates a top view of a wireless earphone software development unit, referred to as a button box (BB);

FIG. 13 illustrates a side view of the BB;

FIG. 14 illustrates a wireless proof of concept demonstration unit;

FIG. 15 illustrates a wireless earphone prototype demo unit;

FIGS. 19A-23 illustrates non-limiting examples of a user GUI system which can operate on the iOS or Android devices;

ABBREVIATIONS

Figure 1:
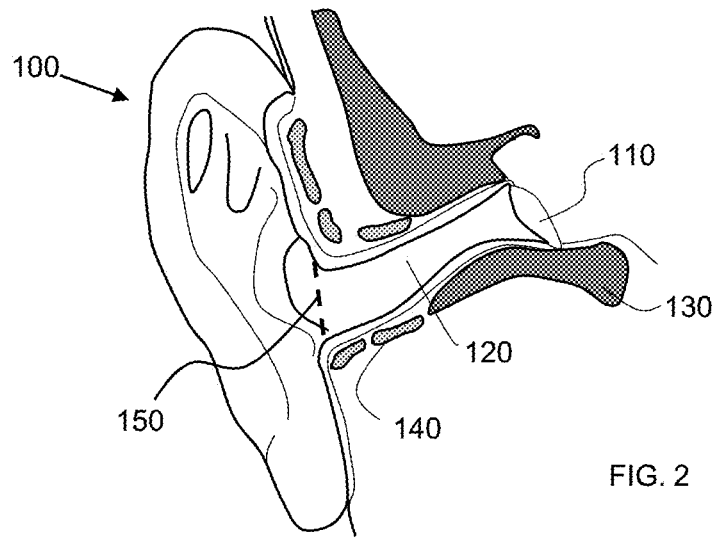
FIG. 1 illustrates a cartilaginous region and a bony region of an ear canal.

A2DP: Advanced Audio Distribution Profile. The Bluetooth 2.1 mode for uni-directional transfer of an audio stream in up to 2 channel stereo, either to or from the Bluetooth host, AKA "music mode".

ASM: Ambient Sound Microphone. Microphones configured to detect sound around the listener, not in the ear canal. There is one external microphone on each HearBud.

BB: Button Box. The BB contains the rev3 PCB board, housing the processors where the HearBud signals are processed, as well as the battery and SD card.

BTLE: Bluetooth low energy, AKA Bluetooth 4.0 (i.e. non-audio low baud data transfer).

CL: Cirrus Logic, the quad core DSP in the ButtonBox.

CSR: Cambridge Silicon Radio Bluetooth module, containing the Bluetooth CSR 8670 chip, antennae, RAM etc.

DE: Directional Enhancement algorithm (works like a highly directional beam former).

DFU: Device Firmware Update. To update CSR and Cirrus Logic DSP codeload using the micro-USB connection with the Windows only CSR application "DFUWizard.exe"—this process is initiated from the iOS and Android app.

ECM: Ear Canal Microphone. Digital microphone for detecting sound in the occluded ear canal of the user. The ASM and ECM are the same component model.

SPKR/ECR: Ear Canal Receiver. A "receiver" is another name for a loudspeaker: it is probably so-called due to Bells 1876 patent for "apparatus for transmitting vocal or other sounds telegraphically", where the "receiver" was the loudspeaker transducer for receiving the telegraphic signal from the far-end party.

HSP/HFP: Headset or hands-free profile mode. In this document, the names are used interchangeably: there is a technical difference, but we mean it to mean the 2-way Bluetooth classic comms. mode.

SNR: Signal-to-noise ratio.

SPKR: LoudSpeaker, this abbreviation is often used instead of ECR but refer to the same component.

DETAILED DESCRIPTION OF EXEMPLARY EMBODIMENTS

The following description of exemplary embodiment(s) is merely illustrative in nature and is in no way intended to limit the invention, its application, or uses.

Exemplary embodiments are directed to or can be operatively used on various wired or wireless audio devices (e.g., hearing aids, ear monitors, earbuds, headphones, ear terminal, behind the ear devices or other acoustic devices as known by one of ordinary skill, and equivalents). For example, the earpieces can be without transducers (for a noise attenuation application in a hearing protective earplug) or one or more transducers (e.g. ambient sound microphone (ASM), ear canal microphone (ECM), ear canal receiver (ECR)) for monitoring/providing sound. In all of the examples illustrated and discussed herein, any specific values should be interpreted to be illustrative only and non-limiting. Thus, other examples of the exemplary embodiments could have different values.

Processes, techniques, apparatus, and materials as known by one of ordinary skill in the art may not be discussed in detail but are intended to be part of the enabling description where appropriate. For example, specific materials may not be listed for achieving each of the targeted properties discussed, however one of ordinary skill would be able, without undo experimentation, to determine the materials needed given the enabling disclosure herein.

Notice that similar reference numerals and letters refer to similar items in the following figures, and thus once an item is defined in one figure, it may not be discussed or further defined in the following figures. Processes, techniques, apparatus, and materials as known by one of ordinary skill in the relevant art may not be discussed in detail but are intended to be part of the enabling description where appropriate.

FIG. 1 illustrates a generic cross section of an ear canal 100, including a cartilaginous region 140 and a bony region 130 of an ear canal 120. The entrance of the ear canal 120 is referred to as the aperture 150 and defines a first end of the ear canal while the tympanic membrane 110 defines the other end of the ear canal 120.

Figure 2:
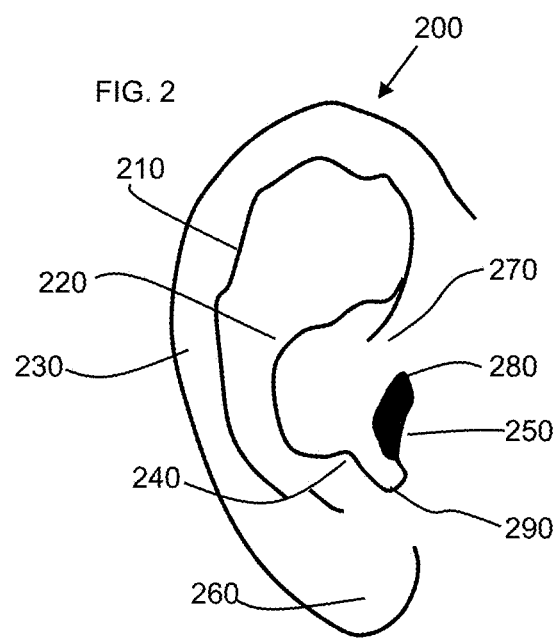
FIG. 2 illustrates general physiology of an ear.

FIG. 2 illustrates general outer physiology of an ear, which includes a, auricle tubercle 210, the antihelix 220, the helix 230, the antitragus 240, tragus 250, lobule of ear 260, crus of helix 270, anterior notch 280, and intertragic incisures 290.

Figure 3:
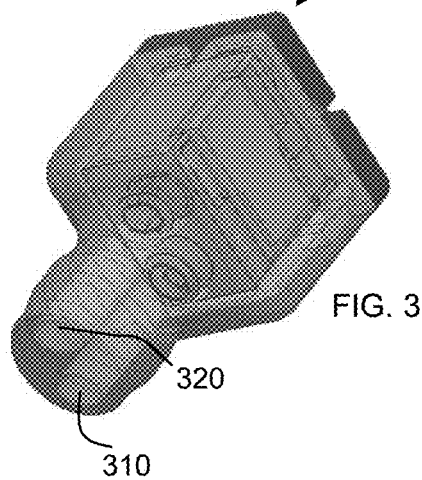
FIG. 3 and FIG. 4 illustrates two different views of an earphone.
Figure 4:
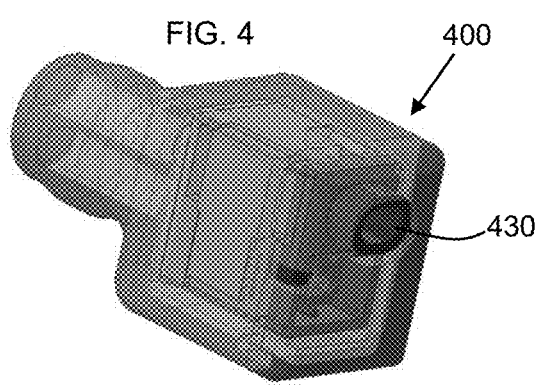

FIG. 3 and FIG. 4 illustrates two different views 300 and 400 of an earphone. View 300 illustrate two channels (e.g., 310 and 320) that open into the ear canal where one channel can be used for an ear canal microphone (ECM) and the other a speaker (SPKR), while the back view 400 illustrates another port 430 that can be used for an ambient sound microphone (ASM) to monitor the sound from the ambient environment.

Figure 5:
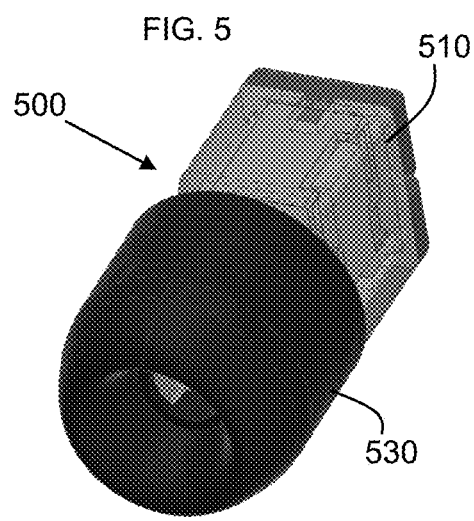
FIG. 5 and FIG. 6 illustrate two earphones each with similar housings accommodating different eartips.
Figure 6:
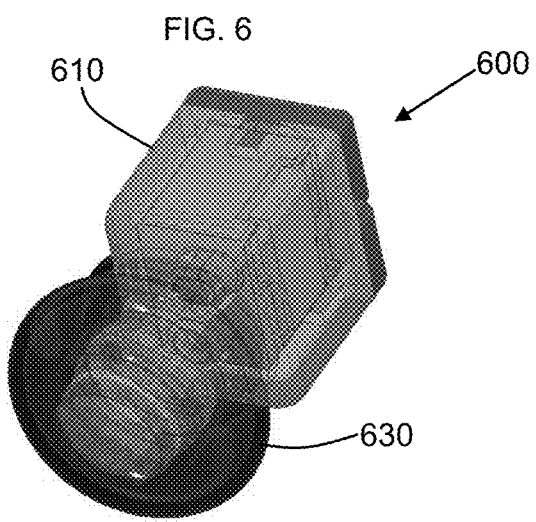

FIG. 5 and FIG. 6 illustrate two earphones 500 and 600 respectively. The earphone 500 shows and earphone housing (EH) 510 that can accommodate a commercially available eartip 530 (e.g. Comply Tips, flange tips). The earphone housing (e.g. 510, 610) can additionally accommodate specialized eartips (e.g. 630). The EH 510 can be fabricated (e.g., molded or 3D printed) from various materials (e.g., silicone, 3D printed material, metal, wood) and any material listed herein for any part of an earphone (housing, microphone, speaker, eartips) should not be interpreted as limitative, but as examples only.

Figure 7:
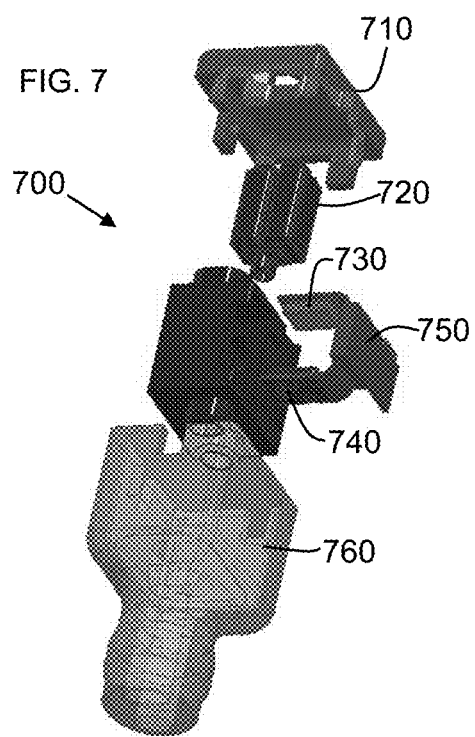
FIG. 7 and FIG. 8 illustrate exploded views of one embodiment of an earphone.
Figure 8:
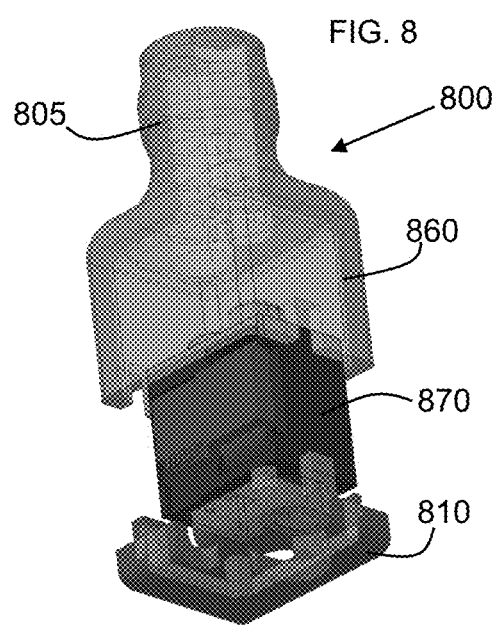

FIG. 7 and FIG. 8 illustrate exploded views of one embodiment of an earphone (e.g. 700 and 800) including two microphones (e.g. 730, 740, e.g. Mems Digital and Analog microphones, e.g. Knowles SiSonic Microphones, model SPH0641LM4H-1, model TO-30043-000 and other microphones that can be used in earphones or phones), a speaker (e.g. 720, e.g., Knowles model RAB-32063, model TWFK-30017-000 and other types of speakers that can be used in earphones or phones) and DSP PCB board (e.g., 750, CSR chips, Wolfson chips, and any other DSP chip that can process audio input that can be used in earphones or phones). The earphone (e.g., 700, 800) includes a cap (e.g. 710, 810) and an earphone housing (EH) (e.g. 760, 860). An electronic package housing (EPH) 870, houses the electronic parts, for example the microphones (e.g. 730, 740), the speakers (e.g. 720), and the DSP PCB board 750. The EH 860 and cap 810 can change to various configuration keeping the EPH 870 constant, facilitating testing of the EPH 870 (with electrical components such as microphones, speakers and DSP inserted) independent of earphone configuration (e.g., shape of housing, stent 805 length).

The materials for the EPH 870, EH 860 and the cap 810 can vary depending upon desired flexibility, level of hydrophobicity required, transparency, electrical isolation, RF shielding, and other properties known by one of ordinary skill in the arts of earphone design. For example, the EPH 870, EH 860, cap 810 can be 3D printed for example using resins such as Form Labs™ elastic resin, tough, grey-pro resins or other 3D printing materials as known by one of ordinary skill in fabricating small parts with tolerances of at least 2 mm. Additionally, the parts can be molded such as with Elastosil®LR3004/30B, silicone, polyurethanes, rubber, Neoprene, or any other type of moldable material as known by one of ordinary skill in the arts of designing or fabricating earphone parts with tolerances of at least 2 mm. Additionally the parts (EPH, EH, cap) can be formed of wood metal and glass.

Figure 9:
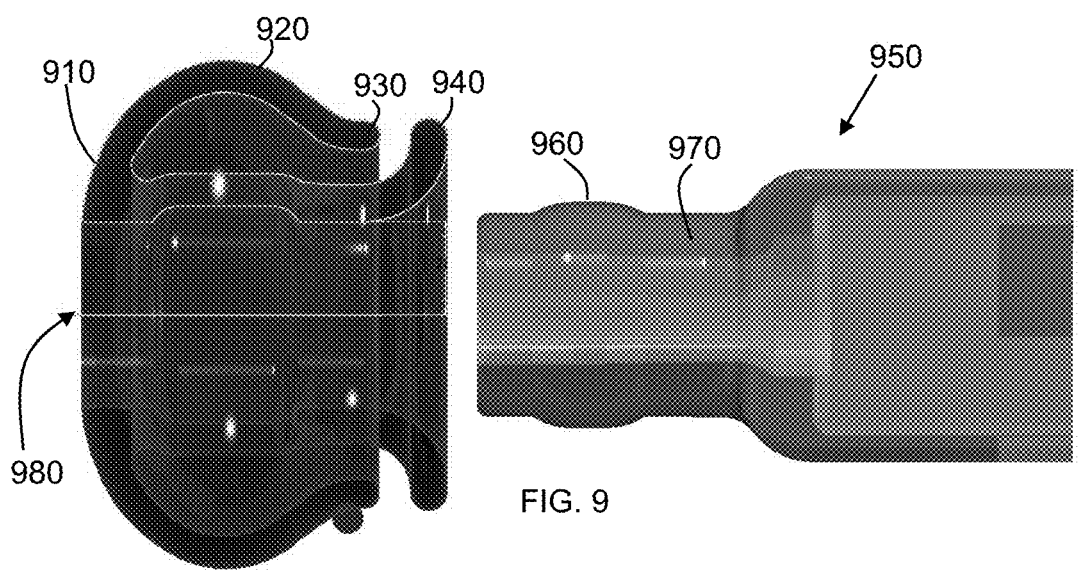
FIG. 9 illustrates the side view of an earphone housing prior to insertion of an eartip.

FIG. 9 illustrates the side view of an earphone housing (EH) 950 prior to insertion of an eartip 980. The EH 950 includes a stent 970 and a retaining ridge 960. The AirTip™ eartip 980, illustrated in FIG. 9, includes a distal end 910, an outer surface 920, an inner lip 930 and a flange end 940. The eartip 980 can be fabricated from any material that has a durometer from 5 shore A to 70 shure A, (e.g., elastic 3D printing resin, silicone, polyurethane, rubber, Neoprene, any material that can be measured under the Shore 00 hardness scale).

Figure 10:
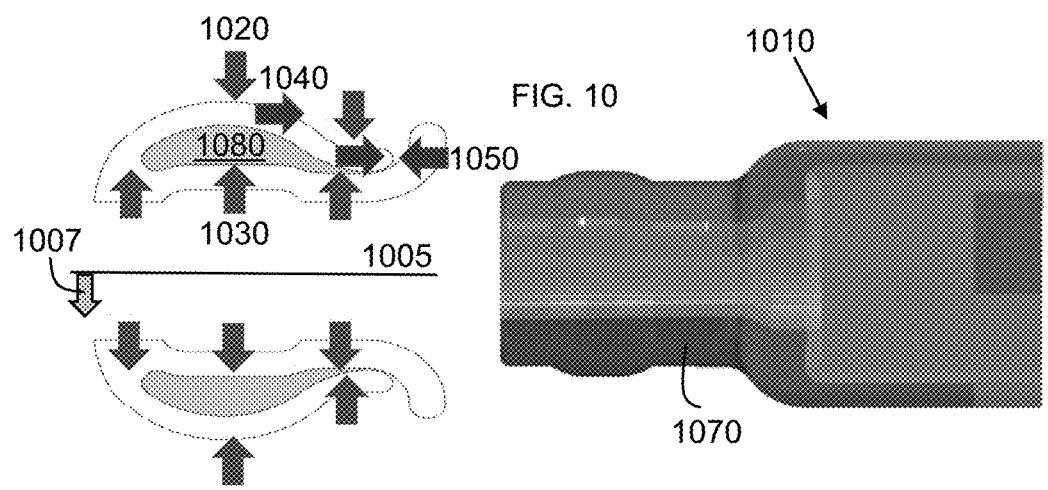
FIG. 10 illustrates the cross section of the AirTip™ prior to stent insertion, showing the movement of parts of the AirTip™ during insertion.

FIG. 10 illustrates the cross section of the AirTip™ prior to stent 1070 insertion of the earphone housing 1010, showing the movement of parts (1020, 1030, 1040, and 1050) of the AirTip™ during insertion. When the stent 1070 is inserted into the flexible (e.g., able to move at least 0.05 mm radially 1007 from a centerline 1005) AirTip™, the AirTip™ internally moves outward 1030 upon stent insertion compressing region 1080, potentially sealing region 1080. When the AirTip™/stent 1070 combination is inserted into an ear canal the ear canal wall presses inward 1020 and/or in an anti-distal 1040 direction, both motions of which can seal region 1080. For example, the inner lip 930 can press against the flange end 940 when an anti-distal motion 1040 occurs, which can occur during ear canal insertion or during motion such as chewing.

Figure 11:
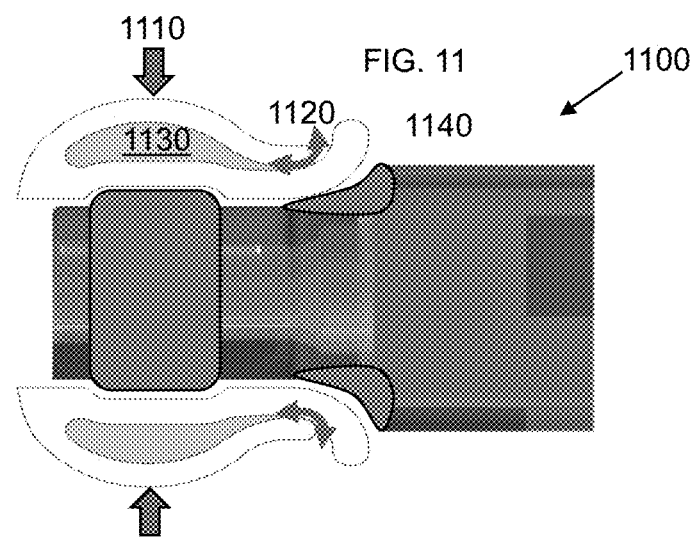
FIG. 11 illustrates the cross section of the AirTip™ on the stent subject to enhanced ear canal radial pressure, for example due to chewing.

FIG. 11 illustrates the cross section of the AirTip™ on the stent subject to ear canal radial pressure, for example due to chewing. Increased radial pressure 1110 can compress region 1130. The motion can seal or encapsulate region 1130 and increased pressure can be released 1120 under inner lip 930 to the ambient environment or vice versa into the region 1130 if the outside pressure is greater than the pressure within region 1130. For example, if the pressure in region 1130 exceeds the pressure in the ambient environment 1140 by a gauge pressure of greater than 0.0001 atm, medium (e.g., gas, liquid, gel) in region 1130 will flow toward the ambient environment 1140. Likewise, if the gauge pressure from the ambient environment 1140 to the region 1130 is greater than 0.0001 atm, medium (e.g., gas, liquid, gel) in the ambient environment 1140 will flow toward the region 1130. For example, when the difference in pressure is at gauge pressure difference of 15 KPa the flow rate, if the medium is air, is about 250 liters/hour. Note that lower or greater pressure differences can be used with lower or greater flow rates.

FIG. 12 illustrates a top view of a wireless earphone software development unit, referred to as a button box (BB) 1200, while FIG. 13 illustrates a side view of BB 1300. The BB 1200 includes a left 1240 and right 1220 earphone interface (e.g., microUSB, lightning connector), micro SD card socket 1210, a micro USB connector 1230 (e.g., 1310), system reset switch 1270, the main button 1260 and a tri-color LED 1250, and an audio input/output 1320 (e.g., TRRS 1.25 mm port). FIG. 13 illustrates a side view of the BB 1300, including a microUSB 1310 and an audio input/output 1320 port.

FIG. 14 illustrates a wireless proof of concept demonstration unit 1400, including the wireless BB 1410 and an earphone 1420 attached via wires to the BB 250. FIG. 15 illustrates a wireless earphone prototype demo unit 1500 that encompasses the functions of the proof of concept demonstration unit 1400.

Figure 16:
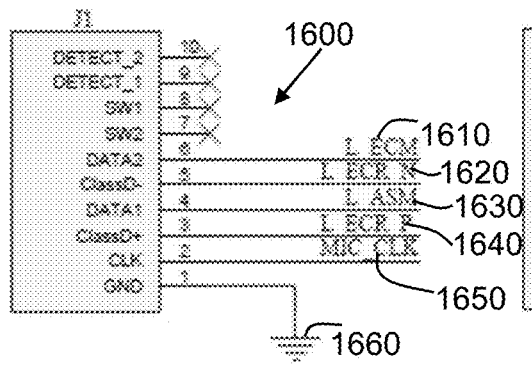
FIG. 16 illustrates the left earphone electrical connector to the BB.
Figure 17:
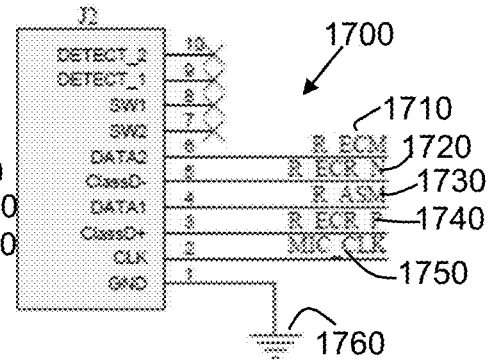
FIG. 17 illustrates the right earphone electrical connection to the BB.

FIG. 16 illustrates the left earphone electrical connector to the BB 1410 and FIG. 17 illustrates the right earphone electrical connection to the BB 1410. IN at least one exemplary embodiment the left (FIG. 16) and right (FIG. 17) earphone connect to the BB 1410 with a standard lightening connector. The plastic case for the male terminal has a "polarized" plastic tab with a blue or red dot, corresponding to the dots on the BB plastic shell for the left and right earphone. The tab fits into a matching "Female" socket on the BB case so that the lightening connector terminals cannot be up-down reversed. There are 5 data and 1 ground wires on the cable between the lightening connectors and the earphones, as shown in FIGS. 16 and 17. The five data wires for the left earphone include the left (L) data line for the ear canal microphone (1610 L_ECM), one for the negative left ear canal receiver (ECR, speaker) (1620 L_ECR_N), one data line for the ambient sound microphone (1630 L_ASM), one for positive left ECR (1640 L_ECR_P), one for the microphone clock (1650 MIC_CLK) and one for the ground 1660. Similarly for the right earphone R_ECM 1710, E_ECR_N 1720, R_ASM 1730, R_ECR_P 1740, MIC_CLK 1750, and ground 1760.

Figure 18:
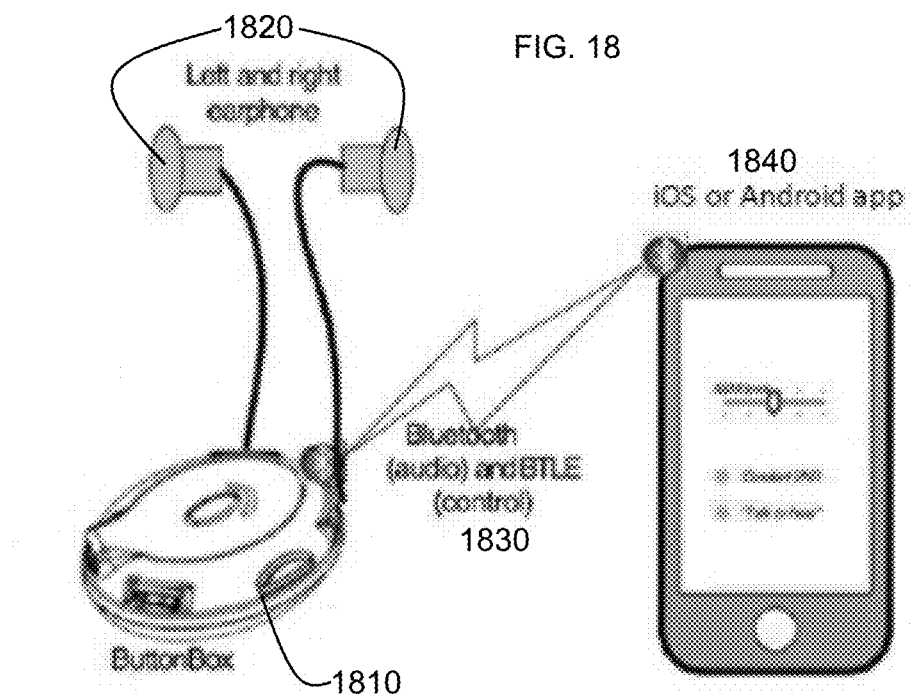
FIG. 18 illustrates essentially a wireless proof of concept system.
Figure 19A:
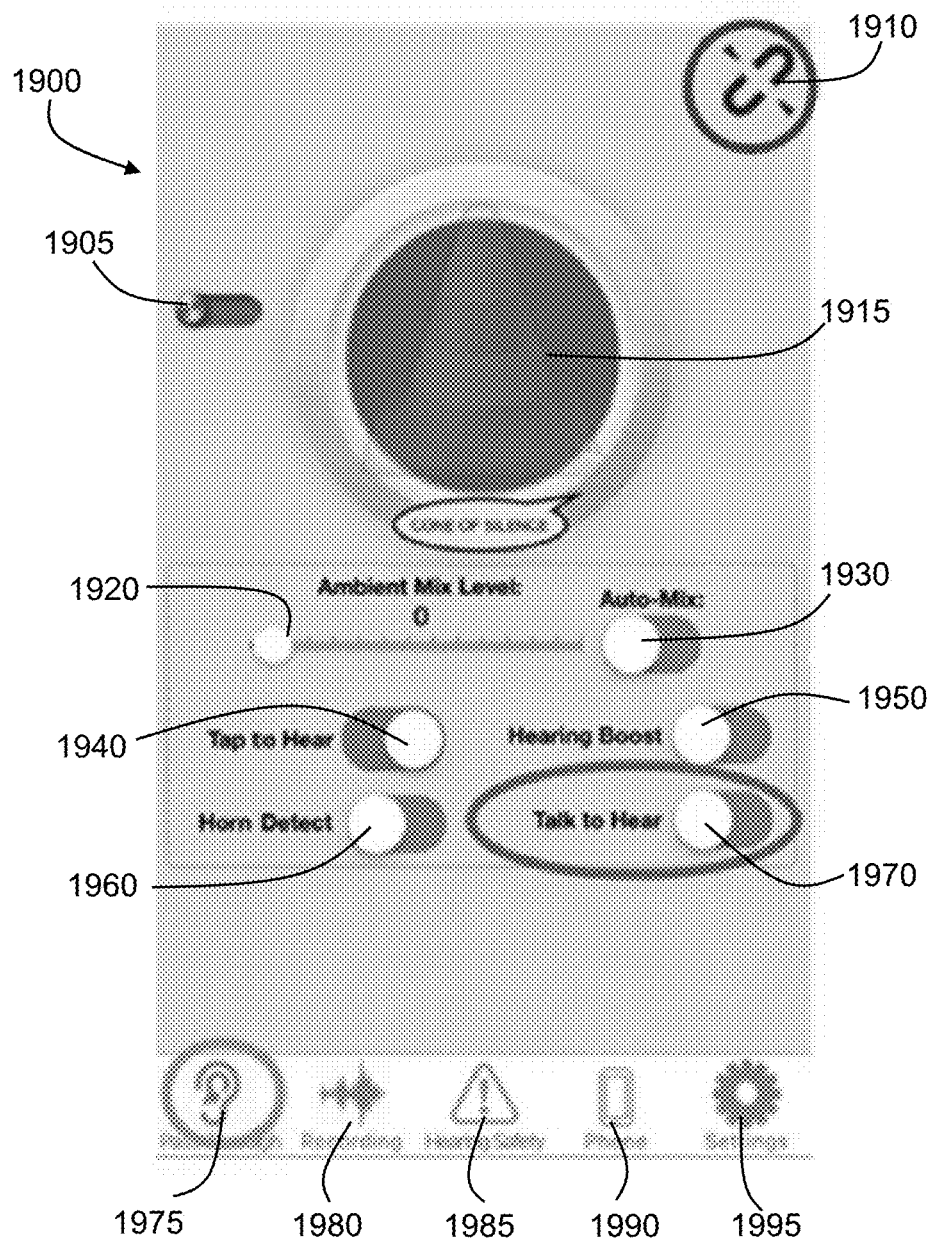
Figure 19B:
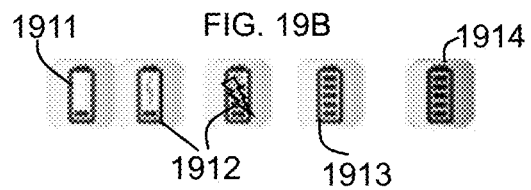
Figure 21:
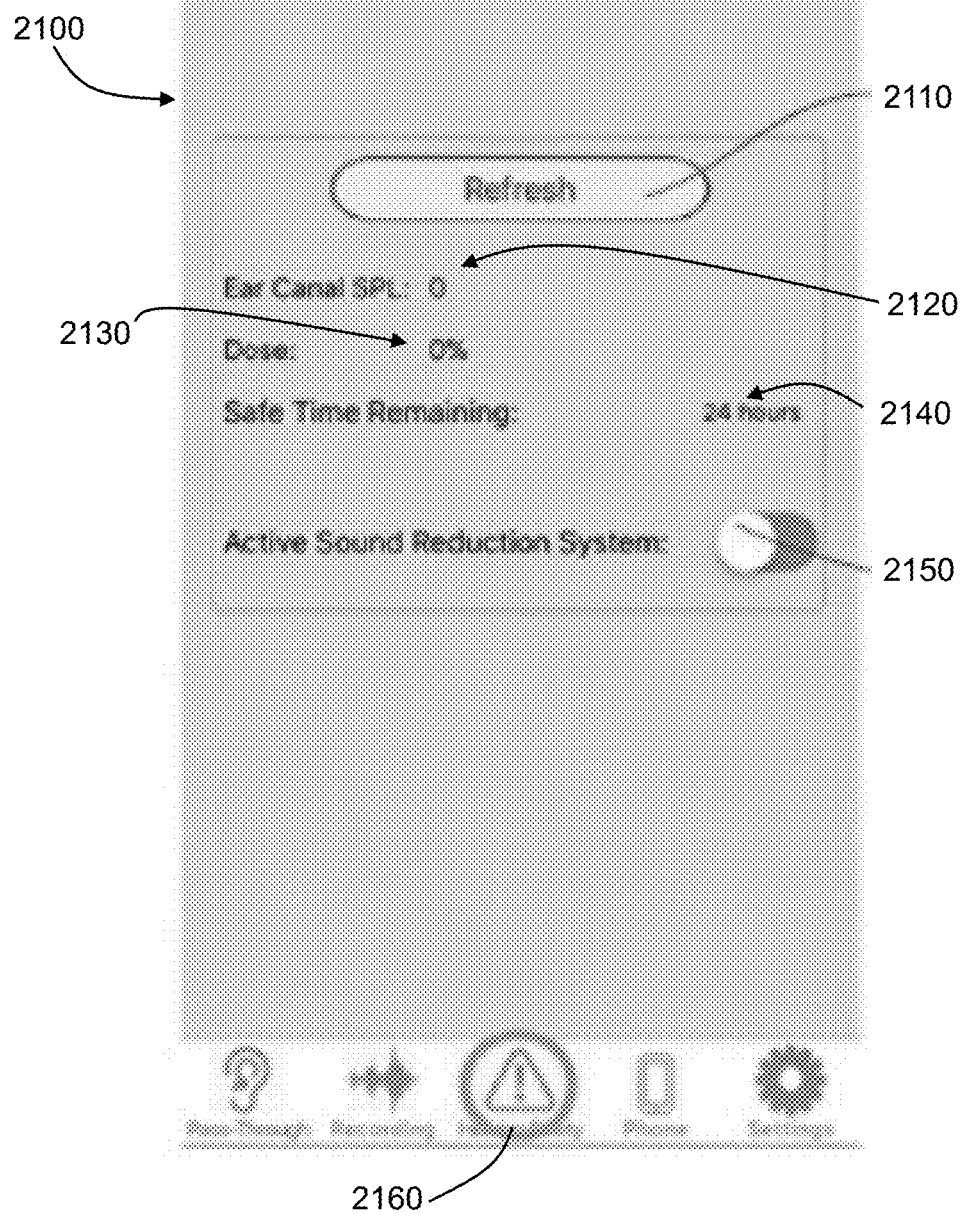
Figure 22:
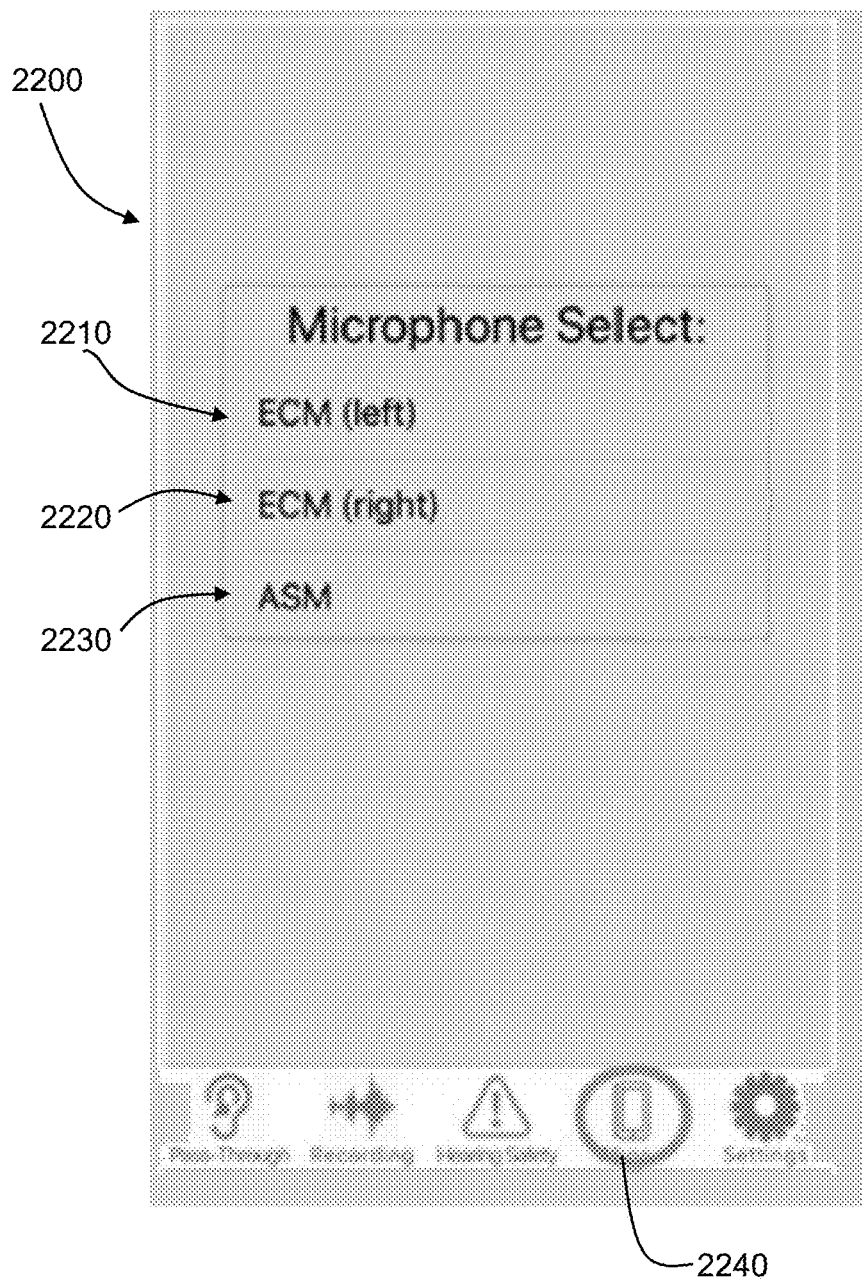
Figure 23:
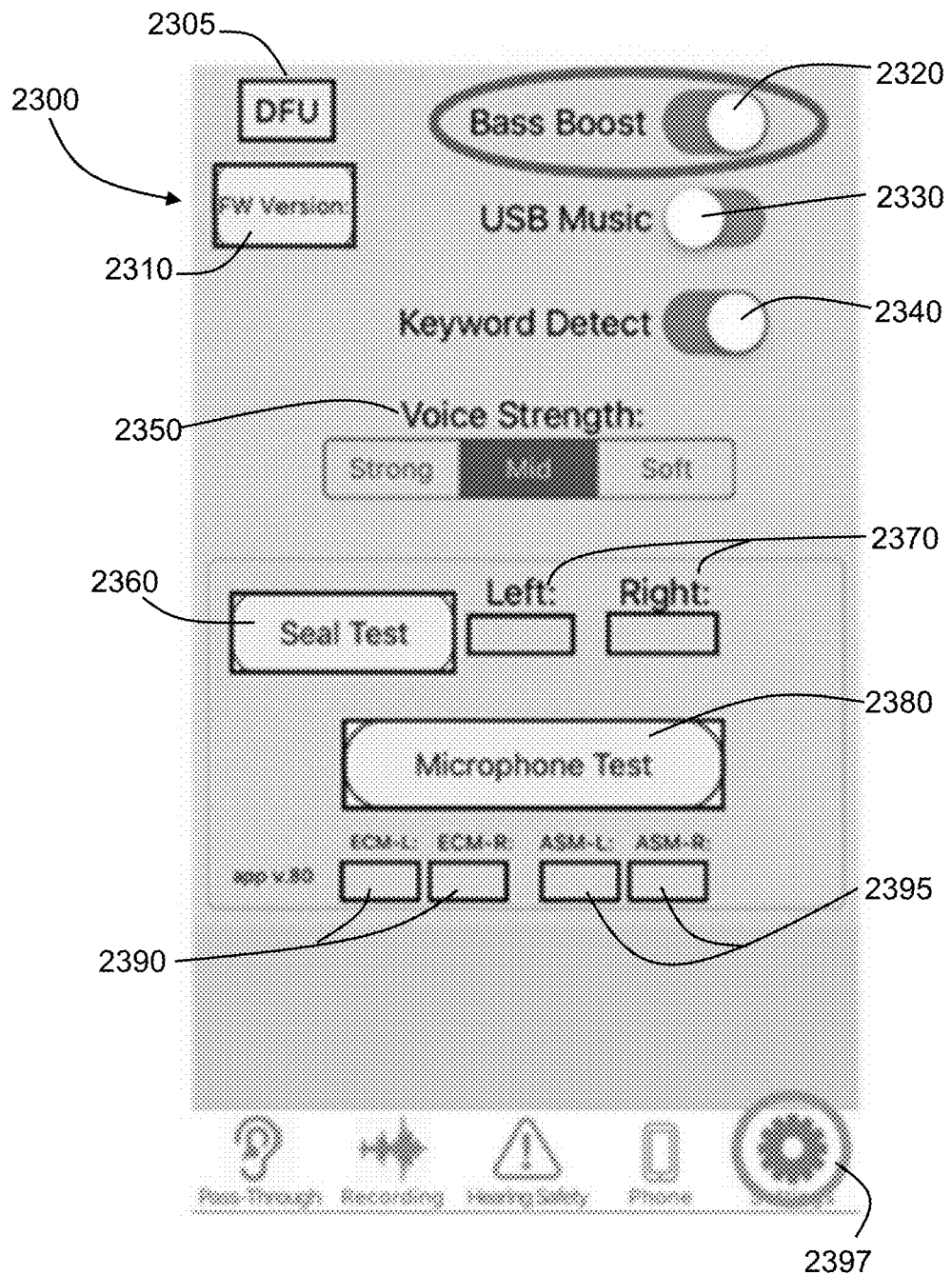

FIG. 18 illustrates a BB 1810, with earphones 1820 connected, where the BB1810 communicates wirelessly 1830 (e.g., Bluetooth, Radio Frequency (RF)) with a device 1840 (e.g., iOS, Android devices). FIG. 18 illustrates essentially a wireless proof of concept system, that can demonstrate the software developed to take care advantage of hardware configuration such as an earphone having an ECM+ASM+SPKR, and an earphone with two ambient microphones (ASM1, ASM2)+ECM+SPKR. The BB software system, HearWare, provides three main functions: Audio recording and playback, Digital Signal Processing of the HearBud microphone and loudspeaker signals, and wireless system control and audio communication via a mobile device application. To support these functions, the Button Box 1810 contains a DSP (e.g., an CSR8670 Audio Processing chip) used for audio signal management and Bluetooth IO for wireless audio and system control, for low-latency, real-time HearBud signal processing, and a controller CPLD.

FIGS. 19-23 illustrates non-limiting examples of a user GUI system which can operate on the iOS or Android devices of 1840. FIG. 19A illustrates the first page 1900 (Ambient Sound Pass-Through Screen) of the GUI using the software (also referred to as HearWare) which can be touched and/or mouse controlled. The first page of the GUI 1900 is active when the ear icon is activated (e.g., highlighted) 1975. The HearWare software comprises three main functions: Audio Management, Digital Signal Processing, and HearWare App. control. All of the software components can be operated from the HearWare app and BB 1810. Additional wireless demo systems can be incorporated into various earphone designs.

HearWare is used as the system control center where the wearer inputs information and settings. HearWare, however, allows the wearer to greatly expand their acoustic experience through the use of unique DSP algorithms which include: Ambient sound pass-through: Manual control: user "dials in" level of ambient sound. Automatic: automatic level control, "talk to hear" system. Sound recognition system: Keyword detection: e.g. start a phone-call automatically with a keyword ("hello blue genie") Sound recognition: horn detection mutes music and passes through ambient sound (situation awareness). Voice communications and voice machine control in high noise environments: Local voice enhancement with the "beam forming" directional enhancement system (for example using the 2 ambient microphones). Voice calls with a remote party using the ear-canal microphone. Audio recording: Long-term audio recording of phone-calls or binaural recording. Instant replay: replay e.g. the last 30 seconds of the phone-call or ambient sound field. System self-test: Ear-seal check (pass/fail). HearBud/earphone transducer status (microphone test display). This robust set of DSP algorithms along with the mobile phone application implementation provides the interface to the HearBud hardware technology.

The Ambient Sound Pass-Through Screen 1900 (FIG. 19A) indicates the GUI system to control, at least, "sound pass through" between the ambient sound microphone (ASM) and the ear canal microphone (ECM). USB connection status and battery level indicator 1910 returns (when a user clicks or touches the icon) images (e.g., 1911, 1913) associated with the level of battery charging (FIG. 98B), whether the BB 1810 is connected to the USB (e.g., lightening symbol on the battery symbol/image 1912), and indicates whether the battery is fully charged (e.g., battery symbol/image color changes, e.g., green, purple 1914). Another feature, the "cone-of-silence", algorithm allows a person-to-person earphone call with both parties using a HearBud. For example, in a noisy environment a caller uses a ECM to pick up the voice of the user which is then transmitted via normal phone line to another user sitting across from the user using their Hearbud and communicating back using the second persons ECM. This feature can be activated by clicking or touching icons 1915, or toggling slider 1905. Another feature mixes the ambient and ear canal microphone by manually setting the relative amount by moving slider 1920 and/or setting an automatic mix 1930. The ambient mix level can combine by a percentage of the amplitudes, power, or any other combination of the ambient and ear canal microphone pickup, which can then be played via he speaker. For example if the ambient level is at 94 dB and an ear canal microphone indicates 74 dB of the ambient makes it into the ear canal, an ambient mix can play some of the ambient via the speaker to bring the level up to some mix of levels between 74 dB and 94 dB (e.g., 86 dB). The Ambient Sound Pass-Through Screen GUI screen 1900 includes additional feature controls. For example, the "Tap to Hear" feature is activated by toggling/sliding the "Tap to Hear" slider 1940. When the "Tap to Hear" feature is activated and a user taps the earphone, any playback can be muted while the ambient microphone pickup is pass through to the ear canal (played by SPKR). Another feature that can be controlled is the "Hearing Boost" feature, which when activated by toggling/sliding 1950, increases the SPKR output of the ASM passthrough. For example, if toggled then the ASM is passthrough is enhanced (e.g., 100% of ASM pickup+10 dB). This can be useful in hearing assist uses. Another feature that can be controlled is the "Horn Detect" feature, which when toggled (clicked on) or button 1960 slid (user drags button circle to left or right) the ASM and/or ECM audio pickup is searched for alarm signals or other sonic signatures, and if detected the signal is passed through to the user (e.g., played via the SPKR). The last feature controlled on the Ambient Sound Pass-Through GUI screen 1900, besides switching between GUI control screens (by clicking or touching 1980, 1985, 1990, and 1995) is the "Talk to Hear" feature. When activated by pressing (toggling) or sliding the button 1970, the "Talk to Hear" feature lowers the sound level of the music being listened to when a user talks and the ambient sound is passed through.

The "Cone of Silence" feature (also referred to as a Directional Enhancement (DE) algorithm) is a custom algorithm that improves the signal-to-noise ratio for the HearBud wearer when listening to close sounds. The default direction is in front of the HearBud wearer, but it could be behind, e.g. for cycling, or at 90 degrees, e.g. for "lean in" application. The algorithm processes sound from the ambient microphone of the HearBud wearer, and only lets sound pass-through and be heard when the sound is coming from a small area in front of the HearBud wearer, i.e. generally from someone in front of the person, whilst blocking out ambient sound pass-through when there is no such strong nearby sound source.

This system should not be confused with a "beam-former". Conventional beam-forming system algorithms need microphones spaced at distances comparable to the wavelengths over which the directional enhancement occurs. This would be over 1 meter to cover the typical speech frequencies above 300 Hz: obviously impracticable for HearBuds. Furthermore, the directional enhancement gain is very modest with conventional filter and sum beam-forming algorithms: approx. 5 dB for every microphone pair.

There are many applications for this algorithm: consumer benefits for social interpersonal interaction in noisy environments; detecting sounds via sound pattern recognition algorithms from specific directions, e.g. out of eyeshot behind a user; increasing directional sensitivity, e.g. to sound behind a user which may otherwise not be heard due to cognitive distraction such as when cycling or running, or as a front end to a voice activity detector, e.g. to detect when someone is speaking with the HearBud wearer. The voice activity detector is used so that we don't update the ambient sound level estimate when the user is talking. Also note that we don't update the Audio gain: we give the user full manual control of this.

The DE algorithm runs on a DSP. The algorithm analyses the signal of two ambient sound microphone inputs on the left HearBud. These microphones are spaced by a given amount, (e.g. 9 mm) with the signals downsampled with the CL DSP "built in" SRC from 48 kHz to 16 kHz. In at least one further exemplary embodiment the DE algorithm uses a 128-band analysis (approx $\frac{2}{3}^{rd}$ octave resolution). The phase of the complex coherence between two ambient sound microphones is calculated and compared with a target coherence phase vector. If the measured and target vector substantially match over e.g. half the vector, then we determine that a close sound source exists at a relative location to the HearBud user substantially equal to the target direction. By default, the target direction is about plus/minus 90 degrees relative to the "Straight ahead" location of the HearBud user. A "learn mode" can be activated via the iOS app whereby a new target sound coherence profile is acquired, e.g. by replaying white noise from a loudspeaker located at 90-degrees to the HearBud wearer. The algorithm uses approx. <50 MIPs for a combined left and right system, running on the DSP1 core, with audio inputs downsampled to 24 kHz using the synchronous sample rate converter (and the outputs are upsampled to 48 kHz).

The Ambient sound passthrough system algorithm (e.g., operated by buttons and sliders 1920, 1930, 1940, 1950, 1960, and 1970). The auto mix feature is activated by slider/button 1930. The auto mix (e.g., constant signal to noise ratio, SNR) algorithm has two modes: a music listening and non-music mode. The first mode is for listening to reproduced music or speech and maintaining a desired (i.e. "roughly constant") ratio between the level of reproduced music or speech and the level of ambient sound pass-through in the ear canal. This allows the HearBud user to always maintain a degree of acoustic "contact" or "situation awareness" with their surroundings. Put simply: when the music level goes up, the ambient sound pass-through gain increases, and when the music level is soft, we reduce the gain of the ambient sound pass-through. In the default setting (which the user cannot change), the rough ratio between these two levels is kept to be approximately 10 dB: i.e. the gain of the ambient sound pass-through is adaptively changed such that music level in the ear canal is always 10 dB higher than the level of ambient sound in the ear-canal. Note that numbers for dB increase or decrease are indicated throughout the application, these values should be considered examples only, and values can range from 0 to 80 dB increase and 0 to −80 dB decrease. The attack and decay times for the ambient sound gain (i.e. high quickly the gain can rise or fall to maintain the roughly constant level ratios) quite slow, e.g. about 50 ms to change by 60 dB. Again although a value of 50 ms is stated, the value can be between 1 ms and 200 ms. This therefore allows the onset of sudden loud ambient sounds to be "passed through" to the ear canal before the ambient sound gain can reduce. These slow time constants helps the wearer to hear and localize the onset of e.g. a car horn or someone shouting at the wearer. When there is no music, the system maintains the ambient sound pass-through level at a roughly constant ear-canal level, by default approx. 75 dB: the ambient sound is "never too loud, never too soft". Such an "auto focus" lens for the acoustic world enabled by this algorithm will enhance personal safety, reduce stress and cognitive loading, and protect the HearBud wearers' ears against hearing damage from excess sound exposure.

The ASM signal is mixed with incoming audio (e.g., to what is sent to SPKR) by a gain value ASM_gain_jhon defined by the slider value in the iOS app, ie a 24-bit value between 0 and 1.0. ASM_gain_jhon is adjusted by comparing the estimated SNR to a desired SNR. As there is no music playing, the SNR (ie variable SNR) is simply a time-smoothed level estimate of the ambient sound level, as measured with an ambient sound microphone (ASM). And the desired SNR (ie variable desired_SNR) is a fixed value, which has the same value as the ASM level for an approximately 75 dB ambient sound field.

Besides the automatic ambient sound pass-through feature, using the iOS app the HearBud user can control ambient sound pass-through from the external HearBud microphones into the HearBud using a gain slider —where 0%=no ambient pass-through, and 100% is an ambient sound passthrough with approximately 6 dB gain. Note that "auto-mix" must be disabled for manual ambient sound passthrough. When the "super ears" selector is selected, the "100%" ambient passthrough corresponds to approximately 15 dB of gain (there is generally feedback, which the "loud ASM level" detector senses and shuts off ambient sound passthrough).

The manual ambient sound mix system is run on DSP, when the "auto-mix" AKA Constant SNR system is enabled, the manual mix system is disabled. For the manual mix mode, the variable mixer_mode can be set to 0 (the auto-mix mode changes this value to 1, i.e. via the iOS app). The ASM signal is mixed with incoming audio by a gain value ASM_gain_app defined by the slider value in the iOS app, ie a 24-bit value between 0 and 1.0: The Hearing Boost variable is also set by the iOS app, and adds an additional gain of about 12 dB (ie a left shift by 4) to the ASM signal.

Another feature includes a "preferred sound level prediction system". This feature estimates the preferred listening level of an individual, and maintains the music playback level at a comfortable level. The ear-canal playback level is monitored over a number of seconds, using an audio compander that attenuates high levels and boosts low-levels such that the user does not have to manually adjust the playback level of the music. The system learns preferred listening levels for an individual by noting how often they manually re-adjust the playback level of music. Different music genres or music with different characteristics (e.g. crest factors) can be associated with different preferred listening levels, e.g. speech playback levels may be louder than orchestral music.

The Recording Screen 2000 (FIG. 20) indicates the GUI system to control, at least, the type of recording and reply and can be displayed by toggling the recording icon 2070. Several features can be activated by pressing the label. The non-limiting features displayed include, disabling the recording "Disabled" 2010, Binaural recording "Binaural" 2020, "Ear Canal Pickup" 2030, and "Phone Call" for recording a phone call. The Replay button/icon 2050 can be toggled to replay a last portion of time of the recording, where a portion of the time segment can be controlled by controlling the time length of the replay 2060. The binaural feature records the audio pickup by the ASM in both earphones recording the phase difference so that the combined audio can be replayed to experience the 3D audio experience.

The binaural recording system provides a useful utility to benefit occasions when we can not repeat a sound announcement or message, but need to hear it again: for instance when we have missed the beginning of an important announcement at the airport, or if an emergency worker misses some important information in an incoming radio message. In a typical configuration, the left and right ambient sound microphone on the HearBud are recorded to a 1 minute stereo circular buffer (this buffer is physically on a SD card in the HearBud control box, buttonbox). When the user hits a button on the app or taps the headphone, the last 15 seconds of the buffer are reproduced via the HearBud loudspeakers. The user can "re-trigger" up to 4 times to decrement the "play head" location of the circular buffer by T-15 seconds. Note that times mentioned are examples only and non-limiting. There are two "tricks" to this utility that make it practical for "catching back up" with the real world: First, when we have triggered the playback of the circular buffer, we are still recording new audio to this buffer. Second, when this "always on" system has been triggered, the replayed message can be played at faster than real time, e.g. the 15 second buffer may be played at 1.5×, i.e. so after 10 seconds, our auditioned audio is only 10 seconds behind the "real world", and after 30 seconds we are "back to reality" (if it wasn't for this second feature, we'd always be listening to the world with a 15 second delay after triggered the playback from the buffer).

For audio archival and offline analysis, up to four audio streams can be recorded to the SD flash card. To minimize power consumption and data usage, this audio can be recorded via an SBC encoder. These four streams are user-configurable, e.g. a binaural recording comprising a left and right ambient sound microphone, plus an incoming audio, and an ear-canal microphone. The audio can be retrieved from the SD card later (it is removable and formatted with FAT). Note that mention of any file format type is a non-limiting example only and other format types can be used.

The Recording Screen 2100 (FIG. 21) indicates the GUI system to monitor the sound pressure dosage a user receives, as measured by ECM and/or ASM. The recording Screen 2100 is activated by toggling the icon 2160. The Ear Canal SPL value is displayed 2120, and the Dose % 2130 is also indicated, and the safe time remaining is also indicated 2140. A feature of Active Sound Reduction System is activated by toggling/sliding 2150 to help reduce exposure. An update of the SPL dosage values can be accomplished by activating the "Refresh" button.

The ear-canal microphone allows for in-situ empirical measurement of sound exposure to the listener. This sound exposure is from ambient sound and audio playback, where the ambient sound is a combination of the "Pass-Through" ambient sound (i.e. electronically reproduced via the ear canal loudspeaker) and the ambient sound leakage through bone-conduction through the skull (the HearBud balloon, AKA AirTip, offers approximately 30 dB of passive isolation). A custom algorithm that predicts permanent hearing damage based on current ear canal sound pressure level and the previous exposure (e.g. past 24 hours). As with other sound dosimetry systems used in industry, the algorithm predicts dose as a percentage, where 100% indicates the user may be at risk to permanent threshold shift (i.e. permanent hearing damage). The particular novelty of the algorithm which sets it apart from a limiting feature of previous sound dosimetry approaches, besides the ear-canal in-situ measurement, is that our algorithm incorporates a so-called "recovery function". The recovery function allows for a relaxation of the dosage over time when the sound pressure is below a certain level, which relates to the metabolic recovery of the inner ear at low sound levels. The sound level dosimetry can be used to warn the user about sound exposure, and also to extend safe listening time by informing our active sound level reduction system, which attenuates loud sounds and prolongs safe listening times.

The active sound reduction system is a system that is informed by the current user sound level dose and can extend safe listening time by attenuating the audio playback level and ensuring the dose is kept below 100%. The system can be activated when listening to music or listening to live ambient sound in a "pass-through" mode, e.g. at a live music event, when operating loud equipment or engaged in activities that generate loud sounds (e.g. sky-diving, jet-skiing).

The Phone Call Microphone Select Screen 2200 (FIG. 22) indicates the GUI system to select which microphone can be used, for example for a phone call in windy environments, in which case an ear canal microphone (ECM) would be desirable to use. The Phone Call Microphone Select Screen 2200 is activated by toggling the icon 2240.

The eartip seal (e.g., AirTip™ eartip) on an earphone (e.g., HearBud) affords between 20 and 30 dB isolation from 100 Hz to 10 kHz. We are therefore afforded this passive improvement in SNR for user voice pickup before any electronic noise reduction system. The benefits of this are obvious: in a phone-call, the far-end individual can hear the HearBud wearer clearly (even in very noisy sound environments over 90 dB, where it would typically be impossible to make a phone call). In noisy environments the HearBud wearer can also hear the incoming call as the AirTip provides the same SNR advantage. Another advantage to telecoms systems is that the transmitted data can be greatly reduced due to the greatly reduced signal entropy, especially when using the aggressive and robust voice activity detection system to mute the outgoing signal when there is no near-end voice. The system automatically adjusts the relative level of ambient sound and sound from an ear-canal microphone pickup. Naturally: in loud ambient sound environments, 100% of the ear canal microphone pickup is used, and conversely 100% of the ambient sound microphone in quiet environments.

The Settings Screen 2300 (FIG. 23) indicates the GUI system to adjust software settings and test sealing. The Settings Screen 2300 is activated by toggling the icon 2397. The GUI can include a DFU button 2305, which is used to place the DSP into firmware update mode (e.g., DFU mode for CSR 8675). A firmware version button 2310, when pressed, indicates the current firmware version. A Bass Boost button 2320 can be toggled, pressed, slid, to activate the "Bass Boost" feature which can add a dB (e.g., +10 dB) level to low shelf bass-boost at a lower frequency (e.g., 60 Hz). A USB Music button 2330 can be pressed, toggled, slid, to place the software mode into USB mode where the data stream (e.g., from the microphones) from a connected USB is fed to a connected device (e.g., phone, computer). The USB mode can selectively bypass any DSP treatment of the audio inputs. A Keyword Detect button 2340 can be toggled, slid, pressed to place the software into keyword detect mode, where the vocal audio is monitored for stored keywords. When the keyword is detected an action associated with the keyword is enacted. For example when the phrase "hello blue genie" is vocalized Siri is activated. A Voice Strength array of buttons 2350, can be toggled between Strong, Mild, and Soft which changes the threshold sensitivity for the Talk to Hear function, for example the user would select Strong if the user has a deep and loud voice. To test the seal of the eartip in the ear the Seal Test button 2360 is pressed, slid, toggled to send a signal to test the seal for the Left and Right earphone, the value of which is displayed 2370. To test the microphones, a Microphone Test button 2380 can be pressed, slid, toggled to monitor audio inputs, the values can be displayed for each of the microphones, ECM-L and ECM-R 2390 (the ear canal microphones from the left and right earphone respectively), and ASM-L and ASM-R 2395 (the ambient sound microphones from the left and right earphone respectively).

To take advantage of the excellent low frequency coupling enabled by the hermitic AirTip seal, there is a "Bass-Boost" selector in the iOS app. This gives a boost of 10 dB at 100 Hz, using a 1 pole high shelf filter design. We use the "built in" EQ's on the DSP for this.

The Tap-Control feature detects a physical touch or finger-tap by the user on one of the HearBuds. The system is robust to false-positives from loud ambient sounds (e.g. door-slams). The tapping is used for muting music playback and activating ambient sound pass-through, but it could be configured for other functions e.g. to activate Siri/Google-voice or to terminate a phone call. Then, to counter false positives from loud ambient sounds such as car door slams etc, we check if there is a loud transient in the contra-lateral HearBud (i.e. right HearBud in this case) over a time period with about 10 ms of the "candidate tap." If there is a peak in the contra-lateral HearBud, then we consider the left HearBud tap a false positive. But if it is determined a "True" finger tap on the left or right HearBud, then the audio playback is muted into DSP and pass through the ASM signal into the ECR.

When user voice activity is detected, an AVRCP Bluetooth command pauses the music playback and passes through ambient sound. This hands-free Talk-To-Hear (TTH) system is particularly useful for quick verbal interchanges without fumbling to pause your music, e.g. saying hi to your neighbor or quickly responding to someone who is addressing you.

To enable the TTH system, the variable TalkToHearStatus must be set to 1 (i.e. set using the button on the iOS app, which sets register 0x480013 to 0x1). The TTH system detects voice activity (VA) of the HearBud wearer. When we have VA, the system turns down the level of replayed audio (e.g. music received via A2DP), and increases the gain of the ambient sound pass-through. The gain of the audio is set to (1-ASM_gain_jhon) and the gain of the ASM pass-through signal is ASM_gain_jhon. For the Talk To Hear system, voice activity is determined by an analysis of the un-normalized cross-correlation between the ECM (post AEC) and ASMO signals of the left HearBud. This method proves quite robust, as we only have significant low frequency energy on the ECM-post AEC signal when the user is speaking, due to the low frequency energy of the ECM signal from the music being cancelled by the AEC system. Note that the cross-correlation uses the "latest" ASM samples but delayed ECM sample, i.e. at the end of the ambient Sound_delayed buffer. This helps avoid false-positives due to a short-term increase in the cross-correlation from wire-taps or other body noise.

The Keyword feature uses an optimized algorithm by Sensory to detect when the HearBud wearer utters a keyword phrase, which in this case is "Hello BlueGenie". This algorithm uses the ear canal microphone signal after it has been processed with an echo-canceller, to remove the "echo" signal from reproduced loudspeaker audio in the same ear canal as the ECM. The keyword can therefore be detected even when there is music playback.

We could of course change the keyword phrase for example we have a target keyword phrase "hey john", for an HearBud wearer called John. So whenever "John" is listening to music when out for a run, his friends can shout across the road "hey john", which could automatically pause music playback, pass through ambient sound and allow John to speak with his name-calling friend. The estimated computational usage is about MIPs=40 (1 phrase), 90 (10 phrases), using 16 kHz input audio.

The ear seal test system estimates how well the HearBud AirTip is sealing the ear canal. The system works by emitting a short low frequency tone (approx. 40 Hz for 1 second) into the ear-canal, and correlating the emitted tone signal with the received ear canal microphone (ECM) signal in the same ear canal. If we have a "good" ear seal, then the correlation will be high (we use the un-normalized correlation). Note that one could also just look at the level of the ECM signal when the tone is emitted, but this would give a less accurate representation of ear seal fitting as the level could be increased due to e.g. ambient sound bleed into the ECM.

A clip and squeal detection feature provides a simple protection against loud ambient sounds affords against possible feedback (i.e. "squeal") during ambient sound monitoring with a bad ear seal, or when removing the earphone if the pass though gain is high. The instantaneous sample level of the front ASM signals are compared with a threshold (e.g., 0.7), and if an ASM sample (absolute) value is greater than this, we set the manual and automatic ambient sound passthrough levels to zero (ie variables ASM_gain and ASM_gain_jhon, respectively).

The horn detection, or sonic signature detection system uses a GMM (Gaussian mixture model) analysis of 8 audio features of an audio signal to determine if the audio signal matches a target sound. The 8 features we look at include MFCC, pitch skewness, kurtosis, and others. In the BB configuration of the algorithm, the ASM signal of 1 HearBud is analyzed to detect a car horn. When a car horn is detected, the system temporarily pauses music playback and routes the ASM signal to the ECR loudspeaker—i.e. increasing situation awareness of the HearBud wearer by allowing the user to hear the ambient sound. The system is trained on about 50 different recording of car horns to generate the target models, and typically detects the sound in 100-300 ms. Note that the number of horns is an example only and is not limited to the number stated, similarly any detection time is an example only (e.g., the time can be between 3 ms-500 ms). The algorithm adjusts the gain of coefficient signalGain, which is applied to the input Ambient Microphone (ASM) signals. When a target sound is detected, signalGain is set to unity, and is zero otherwise (the update is time-smoothed). Likewise, when the target horn sound is detected, the system can mute the "music" audio input.

Exemplary embodiments of eartips and earphone devices, and systems and methods therefore are disclosed. The eartips are self-adjusting for the variable sizes of user anatomy. In use, the eartip can adjust radially and/or linearly for maximum comfort with a maintenance force that is less than an insertion force. The structural configuration of the eartip provides such adjustability while providing a flatter high frequency attenuation profile that maintains audio quality in comparison to traditional ear buds. Further, such adjustability is provided for with improved manufacturing techniques Exemplary embodiments are directed to or can be operatively used on various passive eartips for hearing protection or electronic wired or wireless earpiece devices (e.g., hearing aids, ear monitors, headphones, ear terminal, behind the ear devices or other acoustic devices as known by one of ordinary skill, and equivalents). For example, the earpieces can have one or more transducers (e.g. ambient sound microphone (ASM), ear canal microphone (ECM), ear canal receiver (ECR/SPKR) for monitoring/providing sound. In all of the examples illustrated and discussed herein, any specific values should be interpreted to be illustrative only and non-limiting. Thus, other examples of the exemplary embodiments could have different values.

Figure 24:
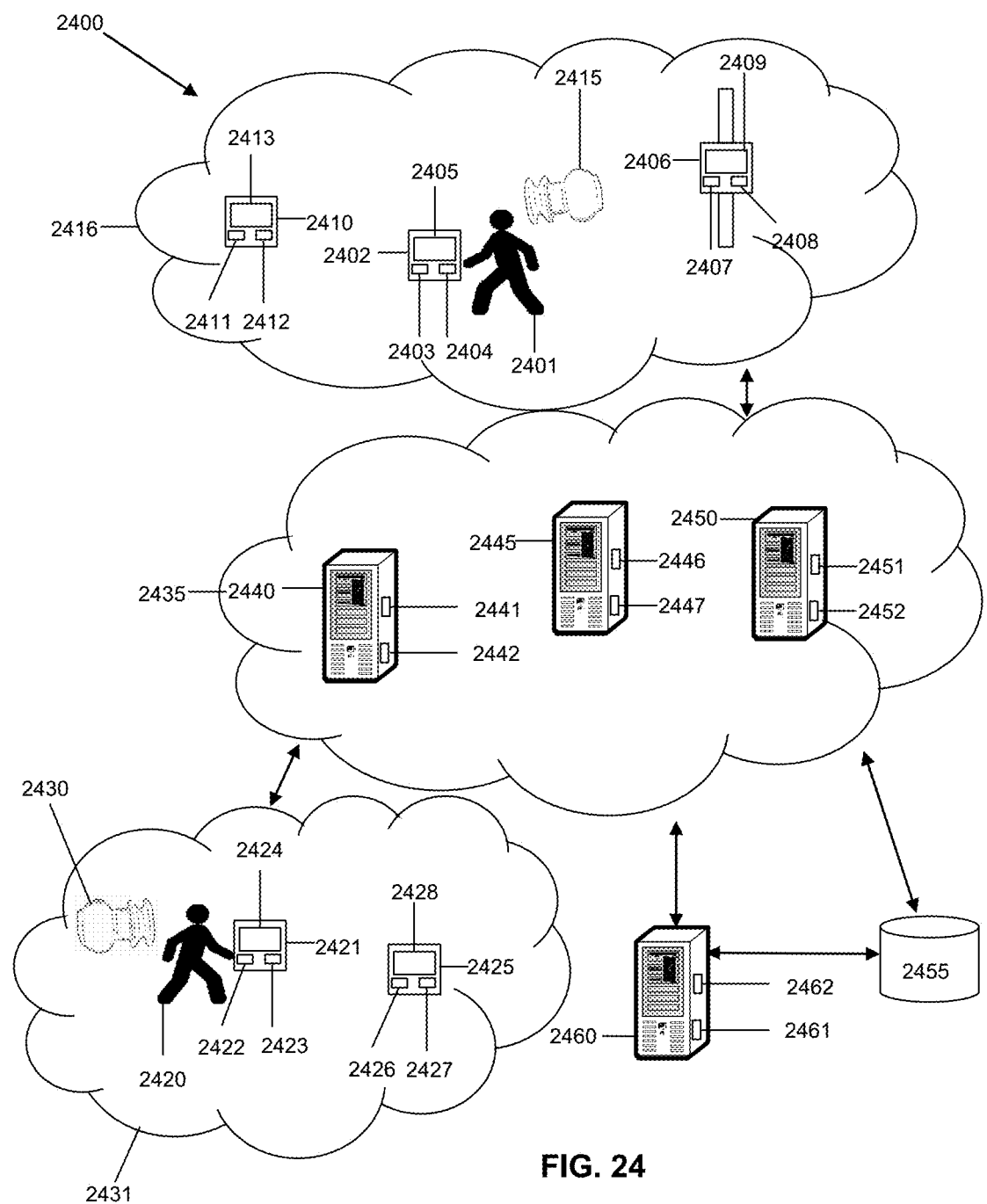
FIG. 24 is a schematic diagram of a system for utilizing eartips according to an embodiment of the present disclosure.

As shown in FIG. 24, a system 2400 and methods for utilizing eartips and/or earphone devices are disclosed.

The system 2400 may be configured to support, but is not limited to supporting, data and content services, audio processing applications and services, audio output and/or input applications and services, applications and services for transmitting and receiving audio content, authentication applications and services, computing applications and services, cloud computing services, internet services, satellite services, telephone services, software as a service (SaaS) applications, platform-as-a-service (PaaS) applications, gaming applications and services, social media applications and services, productivity applications and services, voice-over-internet protocol (VoIP) applications and services, speech-to-text translation applications and services, interactive voice applications and services, mobile applications and services, and any other computing applications and services. The system may include a first user 2401, who may utilize a first user device 2402 to access data, content, and applications, or to perform a variety of other tasks and functions. As an example, the first user 2401 may utilize first user device 2402 to access an application (e.g. a browser or a mobile application) executing on the first user device 2402 that may be utilized to access web pages, data, and content associated with the system 2400. In certain embodiments, the first user 2401 may be any type of user that may potentially desire to listen to audio content, such as from, but not limited to, a music playlist accessible via the first user device 2402, a telephone call that the first user 2401 is participating in, audio content occurring in an environment in proximity to the first user 2401, any other type of audio content, or a combination thereof. For example, the first user 2401 may be an individual that may be participating in a telephone call with another user, such as second user 2420.

The first user device 2402 utilized by the first user 2401 may include a memory 2403 that includes instructions, and a processor 2404 that executes the instructions from the memory 2403 to perform the various operations that are performed by the first user device 2402. In certain embodiments, the processor 2404 may be hardware, software, or a combination thereof. The first user device 2402 may also include an interface 2405 (e.g. screen, monitor, graphical user interface, etc.) that may enable the first user 2401 to interact with various applications executing on the first user device 2402, to interact with various applications executing within the system 2400, and to interact with the system 2400 itself. In certain embodiments, the first user device 2402 may include any number of transducers, such as, but not limited to, microphones, speakers, any type of audio-based transducer, any type of transducer, or a combination thereof. In certain embodiments, the first user device 2402 may be a computer, a laptop, a tablet device, a phablet, a server, a mobile device, a smartphone, a smart watch, and/or any other type of computing device. Illustratively, the first user device 2402 is shown as a mobile device in FIG. 24. The first user device 2402 may also include a global positioning system (GPS), which may include a GPS receiver and any other necessary components for enabling GPS functionality, accelerometers, gyroscopes, sensors, and any other componentry suitable for a mobile device.

In addition to using first user device 2402, the first user 2401 may also utilize and/or have access to a second user device 2406 and a third user device 2410. As with first user device 2402, the first user 2401 may utilize the second and third user devices 2406, 2410 to transmit signals to access various online services and content. The second user device 2406 may include a memory 2407 that includes instructions, and a processor 2408 that executes the instructions from the memory 2407 to perform the various operations that are performed by the second user device 2406. In certain embodiments, the processor 2408 may be hardware, software, or a combination thereof. The second user device 2406 may also include an interface 2409 that may enable the first user 2401 to interact with various applications executing on the second user device 2406 and to interact with the system 2400. In certain embodiments, the second user device 2406 may include any number of transducers, such as, but not limited to, microphones, speakers, any type of audio-based transducer, any type of transducer, or a combination thereof. In certain embodiments, the second user device 2406 may be and/or may include a computer, any type of sensor, a laptop, a set-top-box, a tablet device, a phablet, a server, a mobile device, a smartphone, a smart watch, and/or any other type of computing device. Illustratively, the second user device 2402 is shown as a smart watch device in FIG. 24.

The third user device 2410 may include a memory 2411 that includes instructions, and a processor 2412 that executes the instructions from the memory 2411 to perform the various operations that are performed by the third user device 2410. In certain embodiments, the processor 2412 may be hardware, software, or a combination thereof. The third user device 2410 may also include an interface 2413 that may enable the first user 2401 to interact with various applications executing on the second user device 2406 and to interact with the system 2400. In certain embodiments, the third user device 2410 may include any number of transducers, such as, but not limited to, microphones, speakers, any type of audio-based transducer, any type of transducer, or a combination thereof. In certain embodiments, the third user device 2410 may be and/or may include a computer, any type of sensor, a laptop, a set-top-box, a tablet device, a phablet, a server, a mobile device, a smartphone, a smart watch, and/or any other type of computing device. Illustratively, the third user device 2410 is shown as a smart watch device in FIG. 24.

The first, second, and/or third user devices 2402, 2406, 2410 may belong to and/or form a communications network 2416. In certain embodiments, the communications network 2416 may be a local, mesh, or other network that facilitates communications among the first, second, and/or third user devices 2402, 2406, 2410 and/or any other devices, programs, and/or networks of system 2400 or outside system 2400. In certain embodiments, the communications network 2416 may be formed between the first, second, and third user devices 2402, 2406, 2410 through the use of any type of wireless or other protocol and/or technology. For example, the first, second, and third user devices 2402, 2406, 2410 may communicate with one another in the communications network 2416, such as by utilizing Bluetooth Low Energy (BLE), classic Bluetooth, ZigBee, cellular, NFC, Wi-Fi, Z-Wave, ANT+, IEEE 802.15.4, IEEE 802.22, ISA100a, infrared, ISM band, RFID, UWB, Wireless HD, Wireless USB, any other protocol and/or wireless technology, satellite, fiber, or any combination thereof. Notably, the communications network 2416 may be configured to communicatively link with and/or communicate with any other network of the system 2400 and/or outside the system 2400.

The system 2400 may also include an earphone device 2415, which the first user 2401 may utilize to hear and/or audition audio content, transmit audio content, receive audio content, experience any type of content, process audio content, adjust audio content, store audio content, perform any type of operation with respect to audio content, or a combination thereof. The earphone device 2415 may be an earpiece, a hearing aid, an ear monitor, an ear terminal, a behind-the-ear device, any type of acoustic device, or a combination thereof. The earphone device 2415 may include any type of component utilized for any type of earpiece. In certain embodiments, the earphone device 2415 may include any number of ambient sound microphones that may be configured to capture and/or measure ambient sounds and/or audio content occurring in an environment that the earphone device 2415 is present in and/or is proximate to. In certain embodiments, the ambient sound microphones may be placed at a location or locations on the earphone device 2415 that are conducive to capturing and measuring ambient sounds occurring in the environment. For example, the ambient sound microphones may be positioned in proximity to a distal end (e.g. the end of the earphone device 2415 that is not inserted into the first user's 2401 ear) of the earphone device 2415 such that the ambient sound microphones are in an optimal position to capture ambient or other sounds occurring in the environment. In certain embodiments, the earphone device 2415 may include any number of ear canal microphones, which may be configured to capture and/or measure sounds occurring in an ear canal of the first user 2401 or other user wearing the earphone device 2415. In certain embodiments, the ear canal microphones may be positioned in proximity to a proximal end (e.g. the end of the earphone device 2415 that is inserted into the first user's 2401 ear) of the earphone device 2415 such that sounds occurring in the ear canal of the first user 2401 may be captured more readily.

The earphone device 2415 may also include any number of transceivers, which may be configured transmit signals to and/or receive signals from any of the devices in the system 2400. In certain embodiments, a transceiver of the earphone device 2415 may facilitate wireless connections and/or transmissions between the earphone device 2415 and any device in the system 2400, such as, but not limited to, the first user device 2402, the second user device 2406, the third user device 2410, the fourth user device 2421, the fifth user device 2425, the earphone device 2430, the servers 2440, 2445, 2450, 2460, and the database 2455. The earphone device 2415 may also include any number of memories for storing content and/or instructions, processors that execute the instructions from the memories to perform the operations for the earphone device 2415, and/or any type integrated circuit for facilitating the operation of the earphone device 2415. In certain embodiments, the processors may comprise, hardware, software, or a combination of hardware and software. The earphone device 2415 may also include one or more ear canal receivers, which may be speakers for outputting sound into the ear canal of the first user 2401. The ear canal receivers may output sounds obtained via the ear canal microphones, ambient sound microphones, any of the devices in the system 2400, from a storage device of the earphone device 2415, or any combination thereof.

The ear canal receivers, ear canal microphones, transceivers, memories, processors, integrated circuits, and/or ear canal receivers may be affixed to an electronics package that includes a flexible electronics board. The earphone device 2415 may include an electronics packaging housing that may house the ambient sound microphones, ear canal microphones, ear canal receivers (i.e. speakers), electronics supporting the functionality of the microphones and/or receivers, transceivers for receiving and/or transmitting signals, power sources (e.g. batteries and the like), any circuitry facilitating the operation of the earphone device 2415, or any combination thereof. The electronics package including the flexible electronics board may be housed within the electronics packaging housing to form an electronics packaging unit. The earphone device 2415 may further include an earphone housing, which may include receptacles, openings, and/or keyed recesses for connecting the earphone housing to the electronics packaging housing and/or the electronics package. For example, nozzles of the electronics packaging housing may be inserted into one or more keyed recesses of the earphone housing so as to connect and secure the earphone housing to the electronics packaging housing. When the earphone housing is connected to the electronics packaging housing, the combination of the earphone housing and the electronics packaging housing may form the earphone device 2415. The earphone device 2415 may further include a cap for securing the electronics packaging housing, the earphone housing, and the electronics package together to form the earphone device 2415.

In certain embodiments, the earphone device 2415 may be configured to have any number of changeable tips, which may be utilized to facilitate the insertion of the earphone device 2415 into an ear aperture of an ear of the first user 2401, secure the earphone device 2415 within the ear canal of an ear of the first user 2401, and/or to isolate sound within the ear canal of the first user 2401. The tips may be foam tips, which may be affixed onto an end of the earphone housing of the earphone device 2415, such as onto a stent and/or attachment mechanism of the earphone housing. In certain embodiments, the tips may be any type of eartip as disclosed and described in the present disclosure. The eartips as disclosed in the present disclosure may be configured to facilitate distributed reduced contact force, sound isolation for sound in the ear canal of the first user 2401 (i.e. between the ambient environment and the ear canal environment within an ear of the first user 2401), mold into a variety of forms and/or positions, encapsulate volumes upon insertion into an ear aperture of the first user 2401, have a pressure adjusting design, facilitate notched stent retention (i.e. on a stent of the earphone housing), facilitate stent insertion into an ear canal of the first user 2401 via an ear aperture of the first user 2401, or any combination thereof. In certain embodiments, the eartip may be designed to provide sound isolation capability that is at least as effective as conventional foam and/or flange tips. Notably, the eartips may be manufactured and configured to be made in any desired size specifications and/or materials, and may be tailored to each individual user, such as first user 2401. In contrast to conventional foam or flange tips, an eartip according to the present disclosure may be adjusted for size without having to substitute the eartip with another eartip, may have an EPA NRR rating of NRR=18, may have a unique flatter high frequency attenuation profile so as to maintain audio quality, may have ease of manufacturability, and may be designed to distribute contact force and minimize radial force against a user's ear canal walls when positioned in a user's ear canal. Additionally, an eartip according to the present disclosure may be made of a non-porous material that is not closed cell foam or open cell foam.

In certain embodiments, the eartip may be designed so that the earphone device's 2415 retention force on the ear canal walls of the first user 2401 may be distributed over a larger area than traditional foam or flange tips allow, thereby reducing the pressure on the ear canal walls of the first user 2401. Unlike foam tips, which primarily provide a restoring radial force that exerts pressure against the ear canal walls of a user, the eartip is designed to move both radially and axially, which allows for more give and redistribution of contact over a larger area, and, thus, decreases the retention pressure. As a result, this allows for increased comfort for the user and allows the user to utilize the eartip for an extended period of time when compared to traditional foam and/or flange tips. In certain embodiments, the eartip utilized with the earphone device 2415 may be configured to encapsulate a volume of gas and/or liquid. In either case (i.e. gas or liquid), the bulk of sound isolation provided by the eartip is achieved through the reflection of ambient sound waves so that the encapsulated volume can be low mass. In certain embodiments, portions of the eartip may encapsulate a volume with the ability to release volume when pressed upon without having to incorporate complicated valves. The encapsulated volume may be achieved by the ear canal wall pressing radially and/or axially against the outer surfaces of the eartip, which may force the outer portion of the eartip to seal with the inner portion of the eartip. In certain embodiments, the inner portion of the eartip may be small than the outer diameter of the stent of the earphone housing upon which the eartip is placed so that upon insertion of the eartip on the stent, the inner portion stretches outward to meet the outer surface of the eartip, which further facilitates the sealing of the ear canal of the first user 2401.

In certain embodiments, the stent of the eartip, over which the eartip is placed, may be designed to have a smaller diameter front end and a larger diameter middle section to promote retention of the eartip on the stent itself. In certain embodiments, a portion of the eartip may have an inner core diameter that is smaller than the stent outer diameter so that the eartip provides radial compression upon the stent so as to enhance sealing and to add friction to prevent axial slippage within the ear canal of the first user 2401. In certain embodiments, an increased mid-section inner core diameter of the eartip may be utilized (i.e. larger than the smaller inner core diameter of the eartip), which may be configured to line up with the mid-section outer diameter of the stent of the earphone housing of the earphone device 2415. This may provide axial stability for the earphone device 2415, while simultaneously preventing axial slippage from the ear canal of the first user 2401. In certain embodiments, the eartip may have an insertion end that has a funnel shape, which aids in inserting the eartip onto the stent of the earphone housing of the earphone device 2415.

In certain embodiments, the eartip has a configuration that applies minimal force against the first user's 2401 ear canal. Additionally, the eartip can seal the first user's 2401 ear canal by providing at least 15 dB of attenuation across frequency. To facilitate manufacturability, the eartip may be molded inverted, thereby allowing inexpensive mass production. Lips of the eartip may then be folded to contact ledges to for the eartip that may be utilized by the first user 2401. Sealing and comfort depend upon an accurate fit within the first user's 2401 ear canal, and, as a result, eartips according to the present disclosure may be manufactured in several single sizes, and, because of the unique design of the eartips, a single eartip may be adjusted to fit multiple sizes, which minimizes manufacturing costs, while allowing for more flexibility, versatility, and for a greater number of sizes for the eartip. Notably, any of the features of any of the eartips described in the present disclosure may be combined and/or interchanged with any other eartips described in the present disclosure. Furthermore, the shape, size, features and/or functionality of any of the components of the earphone device and/or hearbud housing device described in the present disclosure may be modified for each particular user for the shape and size of each user's ear aperture and/or ear canal, or a combination thereof.

Notably, in experiments conducted using the eartip, the experiments have shown that the eartip allows for similar levels of sound isolation when compared to conventional foam and/or flange tips. For example, experiments have shown that the eartips provided in the present disclosure provided a NRR of 18 with a generally flat high frequency profile. A flat attenuation profile maintains an ambient environment's frequency profile when level reduced by the attenuation, which can be useful in maintaining the quality of ambient speech and music (or other audio content) during the level reduction process.

In further embodiments, the eartip may be configured to have an open configuration prior to insertion onto a stent of the earphone housing and/or the earphone device 2415 itself. By having an open configuration, the eartip may be mass produced using conventional molding techniques and/or by utilizing 3D commercial printers. The open configuration of the eartip also facilitates molding, and can be 3D printed, where the open configuration allows for resin removal. For example, resin removal may be achieved by utilizing commercial 3D printers that allow the use of lower durometer materials, such as Stratasys machines and the like. In certain embodiments, since the eartip has an open configuration, which is then sealed, any additional pressure can force encapsulated gas out of the eartip relieving the feedback pressure so as to keep the comfort level for the first user 2401 relatively stable.

In addition to the first user 2401, the system 2400 may include a second user 2420, who may utilize a fourth user device 2421 to access data, content, and applications, or to perform a variety of other tasks and functions. Much like the first user 2401, the second user 2420 may be may be any type of user that may potentially desire to listen to audio content, such as from, but not limited to, a storage device of the fourth user device 2421, a telephone call that the second user 2420 is participating in, audio content occurring in an environment in proximity to the second user 2420, any other type of audio content, or a combination thereof. For example, the second user 2420 may be an individual that may be listening to songs stored in a playlist that resides on the fourth user device 2421. Also, much like the first user 2401, the second user 2420 may utilize fourth user device 2421 to access an application (e.g. a browser or a mobile application) executing on the fourth user device 2421 that may be utilized to access web pages, data, and content associated with the system 2400. The fourth user device 2421 may include a memory 2422 that includes instructions, and a processor 2423 that executes the instructions from the memory 2422 to perform the various operations that are performed by the fourth user device 2421. In certain embodiments, the processor 2423 may be hardware, software, or a combination thereof. The fourth user device 2421 may also include an interface 2424 (e.g. a screen, a monitor, a graphical user interface, etc.) that may enable the second user 2420 to interact with various applications executing on the fourth user device 2421, to interact with various applications executing in the system 2400, and to interact with the system 2400. In certain embodiments, the fourth user device 2421 may include any number of transducers, such as, but not limited to, microphones, speakers, any type of audio-based transducer, any type of transducer, or a combination thereof. In certain embodiments, the fourth user device 2421 may be a computer, a laptop, a tablet device, a phablet, a server, a mobile device, a smartphone, a smart watch, and/or any other type of computing device. Illustratively, the fourth user device 2421 may be a computing device in FIG. 24. The fourth user device 2421 may also include any of the componentry described for first user device 2402, the second user device 2406, and/or the third user device 2410. In certain embodiments, the fourth user device 2421 may also include a global positioning system (GPS), which may include a GPS receiver and any other necessary components for enabling GPS functionality, accelerometers, gyroscopes, sensors, and any other corn ponentry suitable for a computing device.

In addition to using fourth user device 2421, the second user 2420 may also utilize and/or have access to a fifth user device 2425. As with fourth user device 2421, the second user 2420 may utilize the fourth and fifth user devices 2421, 2425 to transmit signals to access various online services and content. The fifth user device 2425 may include a memory 2426 that includes instructions, and a processor 2427 that executes the instructions from the memory 2426 to perform the various operations that are performed by the fifth user device 2425. In certain embodiments, the processor 2427 may be hardware, software, or a combination thereof. The fifth user device 2425 may also include an interface 2428 that may enable the second user 2420 to interact with various applications executing on the fifth user device 2425 and to interact with the system 2400. In certain embodiments, the fifth user device 2425 may include any number of transducers, such as, but not limited to, microphones, speakers, any type of audio-based transducer, any type of transducer, or a combination thereof. In certain embodiments, the fifth user device 2425 may be and/or may include a computer, any type of sensor, a laptop, a set-top-box, a tablet device, a phablet, a server, a mobile device, a smartphone, a smart watch, and/or any other type of computing device. Illustratively, the fifth user device 2425 is shown as a tablet device in FIG. 24.

The fourth and fifth user devices 2421, 2425 may belong to and/or form a communications network 2431. In certain embodiments, the communications network 2431 may be a local, mesh, or other network that facilitates communications between the fourth and fifth user devices 2421, 2425, and/or any other devices, programs, and/or networks of system 2400 or outside system 2400. In certain embodiments, the communications network 2431 may be formed between the fourth and fifth user devices 2421, 2425 through the use of any type of wireless or other protocol and/or technology. For example, the fourth and fifth user devices 2421, 2425 may communicate with one another in the communications network 2416, such as by utilizing BLE, classic Bluetooth, ZigBee, cellular, NFC, Wi-Fi, Z-Wave, ANT+, IEEE 802.15.4, IEEE 802.22, ISA100a, infrared, ISM band, RFID, UWB, Wireless HD, Wireless USB, any other protocol and/or wireless technology, satellite, fiber, or any combination thereof. Notably, the communications network 2431 may be configured to communicatively link with and/or communicate with any other network of the system 2400 and/or outside the system 2400.

Much like first user 2401, the second user 2420 may have his or her own earphone device 2430. The earphone device 2430 may be utilized by the second user 2420 to hear and/or audition audio content, transmit audio content, receive audio content, experience any type of content, process audio content, adjust audio content, store audio content, perform any type of operation with respect to audio content, or a combination thereof. The earphone device 2430 may be an earpiece, a hearing aid, an ear monitor, an ear terminal, a behind-the-ear device, any type of acoustic device, or a combination thereof. The earphone device 2430 may include any type of component utilized for any type of earpiece, and may include any of the features, functionality and/or components described and/or usable with earphone device 2415. For example, earphone device 2430 may include any number of transceivers, ear canal microphones, ambient sound microphones, processors, memories, housings, eartips, foam tips, flanges, any other component, or any combination thereof.

In certain embodiments, the first, second, third, fourth, and/or fifth user devices 2402, 2406, 2410, 2421, 2425 and/or earphone devices 2415, 2430 may have any number of software applications and/or application services stored and/or accessible thereon. For example, the first and second user devices 2402, 2411 may include applications for processing audio content, applications for playing, editing, transmitting, and/or receiving audio content, streaming media applications, speech-to-text translation applications, cloud-based applications, search engine applications, natural language processing applications, database applications, algorithmic applications, phone-based applications, product-ordering applications, business applications, e-commerce applications, media streaming applications, content-based applications, database applications, gaming applications, internet-based applications, browser applications, mobile applications, service-based applications, productivity applications, video applications, music applications, social media applications, presentation applications, any other type of applications, any types of application services, or a combination thereof. In certain embodiments, the software applications and services may include one or more graphical user interfaces so as to enable the first and second users 2401, 2420 to readily interact with the software applications. The software applications and services may also be utilized by the first and second users 2401, 2420 to interact with any device in the system 2400, any network in the system 2400 (e.g. communications networks 2416, 2431, 2435), or any combination thereof. For example, the software applications executing on the first, second, third, fourth, and/or fifth user devices 2402, 2406, 2410, 2421, 2425 and/or earphone devices 2415, 2430 may be applications for receiving data, applications for storing data, applications for auditioning, editing, storing and/or processing audio content, applications for receiving demographic and preference information, applications for transforming data, applications for executing mathematical algorithms, applications for generating and transmitting electronic messages, applications for generating and transmitting various types of content, any other type of applications, or a combination thereof. In certain embodiments, the first, second, third, fourth, and/or fifth user devices 2402, 2406, 2410, 2421, 2425 and/or earphone devices 2415, 2430 may include associated telephone numbers, internet protocol addresses, device identities, or any other identifiers to uniquely identify the first, second, third, fourth, and/or fifth user devices 2402, 2406, 2410, 2421, 2425 and/or earphone devices 2415, 2430 and/or the first and second users 2401, 2420. In certain embodiments, location information corresponding to the first, second, third, fourth, and/or fifth user devices 2402, 2406, 2410, 2421, 2425 and/or earphone devices 2415, 2430 may be obtained based on the internet protocol addresses, by receiving a signal from the first, second, third, fourth, and/or fifth user devices 2402, 2406, 2410, 2421, 2425 and/or earphone devices 2415, 2430 or based on profile information corresponding to the first, second, third, fourth, and/or fifth user devices 2402, 2406, 2410, 2421, 2425 and/or earphone devices 2415, 2430.

The system 2400 may also include a communications network 2435. The communications network 2435 may be under the control of a service provider, the first and/or second users 2401, 2420, any other designated user, or a combination thereof. The communications network 2435 of the system 2400 may be configured to link each of the devices in the system 2400 to one another. For example, the communications network 2435 may be utilized by the first user device 2402 to connect with other devices within or outside communications network 2435. Additionally, the communications network 2435 may be configured to transmit, generate, and receive any information and data traversing the system 2400. In certain embodiments, the communications network 2435 may include any number of servers, databases, or other componentry. The communications network 2435 may also include and be connected to a mesh network, a local network, a cloud-computing network, an IMS network, a VoIP network, a security network, a VoLTE network, a wireless network, an Ethernet network, a satellite network, a broadband network, a cellular network, a private network, a cable network, the Internet, an internet protocol network, MPLS network, a content distribution network, any network, or any combination thereof. Illustratively, servers 2440, 2445, and 2450 are shown as being included within communications network 2435. In certain embodiments, the communications network 2435 may be part of a single autonomous system that is located in a particular geographic region, or be part of multiple autonomous systems that span several geographic regions.

Notably, the functionality of the system 2400 may be supported and executed by using any combination of the servers 2440, 2445, 2450, and 2460. The servers 2440, 2445, and 2450 may reside in communications network 2435, however, in certain embodiments, the servers 2440, 2445, 2450 may reside outside communications network 2435. The servers 2440, 2445, and 2450 may provide and serve as a server service that performs the various operations and functions provided by the system 2400. In certain embodiments, the server 2440 may include a memory 2441 that includes instructions, and a processor 2442 that executes the instructions from the memory 2441 to perform various operations that are performed by the server 2440. The processor 2442 may be hardware, software, or a combination thereof. Similarly, the server 2445 may include a memory 2446 that includes instructions, and a processor 2447 that executes the instructions from the memory 2446 to perform the various operations that are performed by the server 2445. Furthermore, the server 2450 may include a memory 2451 that includes instructions, and a processor 2452 that executes the instructions from the memory 2451 to perform the various operations that are performed by the server 2450. In certain embodiments, the servers 2440, 2445, 2450, and 2460 may be network servers, routers, gateways, switches, media distribution hubs, signal transfer points, service control points, service switching points, firewalls, routers, edge devices, nodes, computers, mobile devices, or any other suitable computing device, or any combination thereof. In certain embodiments, the servers 2440, 2445, 2450 may be communicatively linked to the communications network 2435, the communications network 2416, the communications network 2431, any network, any device in the system 2400, any program in the system 2400, or any combination thereof.

The database 2455 of the system 2400 may be utilized to store and relay information that traverses the system 2400, cache content that traverses the system 2400, store data about each of the devices in the system 2400 and perform any other typical functions of a database. In certain embodiments, the database 2455 may be connected to or reside within the communications network 2435, the communications network 2416, the communications network 2431, any other network, or a combination thereof. In certain embodiments, the database 2455 may serve as a central repository for any information associated with any of the devices and information associated with the system 2400. Furthermore, the database 2455 may include a processor and memory or be connected to a processor and memory to perform the various operation associated with the database 2455. In certain embodiments, the database 2455 may be connected to the earphone devices 2415, 2430, the servers 2440, 2445, 2450, 2460, the first user device 2402, the second user device 2406, the third user device 2410, the fourth user device 2421, the fifth user device 2425, any devices in the system 2400, any other device, any network, or any combination thereof.

The database 2455 may also store information and metadata obtained from the system 2400, store metadata and other information associated with the first and second users 2401, 2420, store user profiles associated with the first and second users 2401, 2420, store device profiles associated with any device in the system 2400, store communications traversing the system 2400, store user preferences, store information associated with any device or signal in the system 2400, store information relating to patterns of usage relating to the first, second, third, fourth, and fifth user devices 2402, 2406, 2410, 2421, 2425, store audio content associated with the first, second, third, fourth, and fifth user devices 2402, 2406, 2410, 2421, 2425 and/or earphone devices 2415, 2430, store audio content and/or information associated with the audio content that is captured by the ambient sound microphones, store audio content and/or information associated with audio content that is captured by ear canal microphones, store any information obtained from any of the networks in the system 2400, store audio content and/or information associated with audio content that is outputted by ear canal receivers of the system 2400, store any information and/or signals transmitted and/or received by transceivers of the system 2400, store any device and/or capability specifications relating to the earphone devices 2415, 2430, store historical data associated with the first and second users 2401, 2415, store information relating to the size (e.g. depth, height, width, curvatures, etc.) and/or shape of the first and/or second user's 2401, 2420 ear canals and/or ears, store information identifying and or describing any eartip utilized with the earphone devices 2401, 2415, store device characteristics for any of the devices in the system 2400, store information relating to any devices associated with the first and second users 2401, 2420, store any information associated with the earphone devices 2415, 2430, store log on sequences and/or authentication information for accessing any of the devices of the system 2400, store information associated with the communications networks 2416, 2431, store any information generated and/or processed by the system 2400, store any of the information disclosed for any of the operations and functions disclosed for the system 2400 herewith, store any information traversing the system 2400, or any combination thereof. Furthermore, the database 2455 may be configured to process queries sent to it by any device in the system 2400.

The system 2400 may also include a software application, which may be configured to perform and support the operative functions of the system 2400, such as the operative functions of the first, second, third, fourth, and fifth user devices 2402, 2406, 2410, 2421, 2425 and/or the earphone devices 2415, 2430. In certain embodiments, the application may be a website, a mobile application, a software application, or a combination thereof, which may be made accessible to users utilizing one or more computing devices, such as the first, second, third, fourth, and fifth user devices 2402, 2406, 2410, 2421, 2425 and/or the earphone devices 2415, 2430. The application of the system 2400 may be accessible via an internet connection established with a browser program or other application executing on the first, second, third, fourth, and fifth user devices 2402, 2406, 2410, 2421, 2425 and/or the earphone devices 2415, 2430, a mobile application executing on the first, second, third, fourth, and fifth user devices 2402, 2406, 2410, 2421, 2425 and/or the earphone devices 2415, 2430, or through other suitable means. Additionally, the application may allow users and computing devices to create accounts with the application and sign-in to the created accounts with authenticating username and password log-in combinations. The application may include a custom graphical user interface that the first user 2401 or second user 2420 may interact with by utilizing a browser executing on the first, second, third, fourth, and fifth user devices 2402, 2406, 2410, 2421, 2425 and/or the earphone devices 2415, 2430. In certain embodiments, the software application may execute directly as an installed program on the first, second, third, fourth, and fifth user devices 2402, 2406, 2410, 2421, 2425 and/or the earphone devices 2415, 2430.

Computing System for Facilitating the Operation and Functionality of the System

Figure 25:
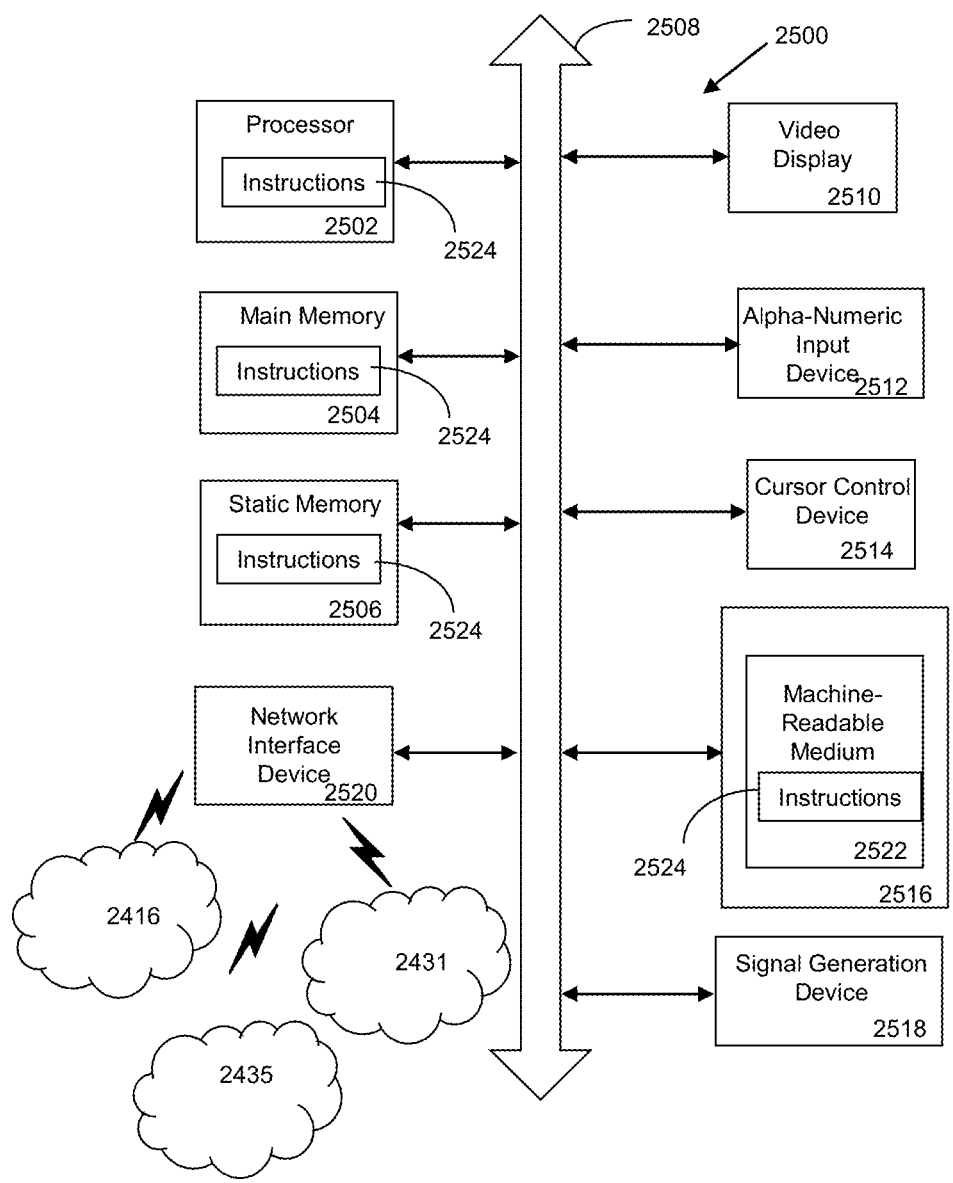
FIG. 25 is a schematic diagram of a machine in the form of a computer system which a set of instructions, when executed, may cause the machine to perform any one or more of the methodologies or operations of the systems and methods for utilizing an eartip according to embodiments of the present disclosure.

Referring now also to FIG. 25, at least a portion of the methodologies and techniques described with respect to the exemplary embodiments of the system 2400 can incorporate a machine, such as, but not limited to, computer system 2500, or other computing device within which a set of instructions, when executed, may cause the machine to perform any one or more of the methodologies or functions discussed above. The machine may be configured to facilitate various operations conducted by the system 2400. For example, the machine may be configured to, but is not limited to, assist the system 2400 by providing processing power to assist with processing loads experienced in the system 2400, by providing storage capacity for storing instructions or data traversing the system 2400, by providing functionality and/or programs for facilitating the operative functionality of the earphone devices 2415, 2430, and/or the first, second, third, fourth, and fifth user devices 2402, 2406, 2410, 2421, 2425 and/or the earphone devices 2415, 2430, by providing functionality and/or programs for facilitating operation of any of the components of the earphone devices 2415, 2430 (e.g. ear canal receivers, transceivers, ear canal microphones, ambient sound microphones, or by assisting with any other operations conducted by or within the system 2400.

In some embodiments, the machine may operate as a standalone device. In some embodiments, the machine may be connected (e.g., using communications network 2435, the communications network 2416, the communications network 2431, another network, or a combination thereof) to and assist with operations performed by other machines and systems, such as, but not limited to, the first user device 2402, the second user device 2411, the third user device 2410, the fourth user device 2421, the fifth user device 2425, the earphone device 2415, the earphone device 2430, the server 2440, the server 2450, the database 2455, the server 2460, or any combination thereof. The machine may be connected with any component in the system 2400. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 2500 may include a processor 2502 (e.g., a central processing unit (CPU), a graphics processing unit (GPU, or both), a main memory 2504 and a static memory 2506, which communicate with each other via a bus 2508. The computer system 2500 may further include a video display unit 2510, which may be, but is not limited to, a liquid crystal display (LCD), a flat panel, a solid state display, or a cathode ray tube (CRT). The computer system 2500 may include an input device 2512, such as, but not limited to, a keyboard, a cursor control device 2514, such as, but not limited to, a mouse, a disk drive unit 2516, a signal generation device 2518, such as, but not limited to, a speaker or remote control, and a network interface device 2520.

The disk drive unit 2516 may include a machine-readable medium 2522 on which is stored one or more sets of instructions 2524, such as, but not limited to, software embodying any one or more of the methodologies or functions described herein, including those methods illustrated above. The instructions 2524 may also reside, completely or at least partially, within the main memory 2504, the static memory 2506, or within the processor 2502, or a combination thereof, during execution thereof by the computer system 2500. The main memory 2504 and the processor 2502 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 2522 containing instructions 2524 so that a device connected to the communications network 2435, the communications network 2416, the communications network 2431, another network, or a combination thereof, can send or receive voice, video or data, and communicate over the communications network 2435, the communications network 2416, the communications network 2431, another network, or a combination thereof, using the instructions. The instructions 2524 may further be transmitted or received over the communications network 2435, another network, or a combination thereof, via the network interface device 2520.

While the machine-readable medium 2522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device," or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

In at least one embodiment the step of measuring the vocalization of the user with an ear canal microphone and an ambient sound microphone refers to the microphone measuring the acoustic environment to which it is exposed, where the acoustic environment can include the user's voice or another's voice, and where the system 2400 can be configured to separate the user's voice from another's by comparing the ECM pickup with the ASM. For example, the ECM will primarily pickup the user's voice whose spectrum can be compared to the ASM pickup spectrum to separate out the user's voice in the ASM pickup from the ambient environment. For example, parsing the temporal signal from eth ECM and ASM into blocks, e.g., 256, and performing and FFT on the block, then looking at the amplitude and phase.

In at least one embodiment determining whether the user is in a noisy or quiet environment refers to measuring the SPL levels of the acoustic environment sampled by the ECM and ASM, and comparing the SPL levels to NIOSH and EPA standards for noise exposure, for example, a threshold level of 85 dB can be used as a threshold above which can be referred to as noisy, while a different lower level can be used to determine quiet, for example levels below 60 dB can be referred to as quiet. Note those these threshold values are non-limiting examples.

In at least one embodiment the step of analyzing the measured vocalization for detecting a keyword or keyphrase can include obtaining the spectrum of the ASM and/or ECM pickup and matching the spectrum to a database of stored spectrums associated with a keyword and/or phrase. Additionally, the spectrum can be binned by frequency ranges for example the spectrum from 50 Hz to 8000 Hz can be binned by increments of 100 Hz with an average value associated with the central frequency of the bin. Then the spectrum can be normalized and compared to similar normalized spectrum in the keyword/keyphrase database. A threshold level, for example above 0.5 is a positive for that bin. A sum of the bins can determine whether the keyword/keyphrase has been identified. Note the threshold values are only a non-limiting example, its can be between 0.2 and 0.99. Note also a gaussian mixture model can be used and any other model as know by one of ordinary skill in identifying vocal patterns from acoustic signals.

In at least one embodiment the step of matching the detected keyword or keyphrase to an action can refer to matching the identified keyword/keyphrase to an action listed on a database. A series of actions can be associated with the keyword/keyphrase. For example, the keyphrase "hello bluegeenie" can refer to an action of enabling google assistant and searching the word or phrase that follows the keyword/keyphrase.

In at least one embodiment a noisy environment is determined by converting the ambient microphone measured vocalization which includes ambient noise into a sound pressure level (SPL_ASM), and if the SPL_ASM is above about 75 dB the environment is identified as noisy and if the SPL_ASM is below about 60 dB the environment is considered quiet.

In at least one embodiment the ear canal microphone is acoustically isolated from the noisy environment by at least a 15 dB decrease between SPL_ASM as measured by the ambient sound microphone and a sound pressure level as measured by the ear canal microphone (SPL_ECM).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions of the relevant exemplary embodiments. For example, if words such as "orthogonal", "perpendicular" are used, the intended meaning is "substantially orthogonal" and "substantially perpendicular" respectively. Additionally, although specific numbers may be quoted in the claims, it is intended that a number close to the one stated is also within the intended scope, i.e. any stated number (e.g., 20 mils) should be interpreted to be "about" the value of the stated number (e.g., about 20 mils).

Thus, the description of the invention is merely exemplary in nature and, thus, variations that do not depart from the gist of the invention are intended to be within the scope of the exemplary embodiments of the present invention. Such variations are not to be regarded as a departure from the spirit and scope of the present invention.

What is claimed is:

1. A method of controlling an earphone worn by a user, where the earphone includes a speaker, an ambient microphone, and an ear canal microphone, comprising the steps of:
measuring a vocalization by the user using an ear canal microphone and an ambient sound microphone;
determining whether the user is in a noisy or quiet environment;
analyzing the measured vocalization for detecting a keyword or keyphrase using the vocalization measured by the ear canal microphone if in a noisy environment or using the vocalization measured by the ambient microphone if in a quiet environment;
matching the detected keyword or keyphrase to an action; and
enacting the action, where the action is at least one of the following, making a phone call by automatically dialing a phone number associated with a portion of the keyword or keyphrase, changing the volume of audio playback in the earphone, activating a search engine to begin search on a portion of the keyword or keyphrase, changing the audio being played by the earphone, and activating or deactivating features of the earphone.

2. The method according to claim 1, where a noisy environment is determined by converting the ambient microphone measured vocalization which includes ambient noise into a sound pressure level (SPL_ASM), and if the SPL_ASM is above 75 dB the environment is identified as noisy and if the SPL_ASM is below 60 dB the environment is considered quiet.

3. The method according to claim 2, where the ear canal microphone is acoustically isolated from the noisy environment by at least a 15 dB decrease between SPL_ASM as measured by the ambient sound microphone and a sound pressure level as measured by the ear canal microphone (SPL_ECM).

4. The method according to claim 3, where the step of analyzing the measured vocalization uses a Gaussian Mixture Model to identify a keyword or keyphrase.

5. The method according to claim 4, where the step of matching the identified keyword or keyphrase to an action includes matching the keyword or keyphrase to a database where the database includes an action or actions connected to the keyphrase or keyword.

6. The method according to claim 5, where the step of enacting the action linked to the keyword or keyphrase by sending a wireless signal to the earphone or a device wirelessly linked to the earphone.

7. A method of controlling an earphone using a graphic user interface (GUI) displayed on a device wirelessly linked to the earphone worn by a user, where the earphone includes a speaker, an ambient microphone, and an ear canal microphone, comprising the steps of:
connecting an earphone to a device wirelessly;
activating a software program on the device to control the earphone, whereupon activating the software program displays an earphone control GUI onto the display of the device, where the earphone control GUI displays a first page with at least one of a button and slider that can be activated by the user's touch, where the first page includes several icons associated with other hidden pages of the earphone control GUI, where the icons can be touched by the user to replace the displayed page with eth hidden page related to the icon touched.

8. A method of controlling an earphone using a graphic user interface (GUI) displayed on a device wirelessly linked to an earphone, where the earphone includes a speaker (SPKR), an ambient microphone (ASM), and an ear canal microphone, comprising the steps of:

displaying a graphic user interface (GUI) onto a display of a device that is wirelessly linked to the earphone;

displaying a first screen of the GUI, which includes an image of a slider that includes an image of a slider button that is configured so that a user can move the slider button to adjust the audio passthrough from the ASM to the speaker by touching a finger on the slider button and performing the finger motion of touching and dragging the button a distance between and including from one side representing full ASM passthrough to the opposite side representing no ASM passthrough, where when the motion is stopped and the finger is removed from touching a signal is sent to the earphone setting a ratio from 1.0 (full ASM passthrough) to 0.0 (no ASM passthrough) where the location of the finger when it is removed determines the value of the ratio sent to the earphone.

9. A method according to claim 8 further including:

displaying a "Hearing Boost" image button on a screen of the GUI on the device, configured so that when pressed a signal is sent to the earphone to increase the signal sent from the ASM to the SPKR by a predetermined amount.

10. The method according to claim 9, where the predetermined amount is between the range of 5 dB to 20 dB.

11. A method according to claim 9 further including:

displaying a "Talk to Hear" image button on a screen of the GUI on the device, configured so that when pressed a signal is sent to the earphone to activate a talk to hear feature.

12. A method according to claim 9 further including:

displaying a "Tap to Hear" image button on a screen of the GUI on the device, configured so that when pressed or slid a signal is sent to the earphone to activate a talk to hear feature.

13. A method according to claim 9 further including:

displaying a sonic signature image button on a screen of the GUI on the device, configured so that when pressed or slid a signal is sent to the earphone to activate detection of sonic signatures.

14. the method according to claim 13, where the sonic signature to be detected are alarms.

15. A method according to claim 9 further including:

displaying a Binaural image button on a screen of the GUI on the device, configured so that when pressed or slid a signal is sent to the earphone to activate binaural recording.

16. A method according to claim 9 further including:

displaying a SPL Dosage button on a screen of the GUI on the device, configured so that when pressed or slid a signal is sent to the earphone to send a SPL dosage data to the device; and displaying the SPL dosage data on the GUI.

17. A method according to claim 9 further including:

displaying a SPL Dosage button on a screen of the GUI on the device, configured so that when pressed or slid a signal is sent to the earphone to send a SPL dosage data to the device; and displaying the SPL dosage data on the GUI.

18. A method according to claim 9 further including:

displaying a Seal Test button on a screen of the GUI on the device, configured so that when pressed or slid a signal is sent to the earphone to start a test for the earphone seal and generating a seal quality value representing the quality of sealing of the earphone in a user's ear and sending the seal quality value to the device; and displaying the seal quality value on the GUI.

19. A method according to claim 9 further including:

displaying a Microphone Test button on a screen of the GUI on the device, configured so that when pressed or slid a signal is sent to the earphone to start a test of the ASM and ECM of the earphone and generating a ASM value and an ECM value and sending the ASM value and the ECM value to the device; and displaying the ASM value and the ECM value on the GUI.

20. A method according to claim 9 further including:

displaying a keyword detect image button on a screen of the GUI on the device, configured so that when pressed or slid a signal is sent to the earphone to activate detection of keywords or keyphrases.

\* \* \* \* \*

UNITED STATES PATENT AND TRADEMARK OFFICE
CERTIFICATE OF CORRECTION

PATENT NO. : 10,817,252 B2
APPLICATION NO. : 16/298147
DATED : October 27, 2020
INVENTOR(S) : John Usher and John P. Keady It is certified that error appears in the above-identified patent and that said Letters Patent is hereby corrected as shown below:

In the Claims

Column 28, Claim 7, Line 64 reads:
with eth hidden page related to the icon touched.

Should read:
with the hidden page related to the icon touched.

Signed and Sealed this
Twenty-second Day of June, 2021

Drew Hirshfeld
*Performing the Functions and Duties of the
Under Secretary of Commerce for Intellectual Property and
Director of the United States Patent and Trademark Office*